(12) United States Patent
Sakaguchi et al.

(10) Patent No.: US 6,328,240 B1
(45) Date of Patent: Dec. 11, 2001

(54) CAM ADJUSTER MECHANISM FOR BRAKE MECHANISM IN FISHING REEL

(75) Inventors: Noboru Sakaguchi, Kishiwada (JP); Ong San Cheng, Singapore (SG)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/503,499

(22) Filed: Feb. 14, 2000

(30) Foreign Application Priority Data

Mar. 30, 1999 (JP) .................................................. 11-089858

(51) Int. Cl.⁷ ..................... A01K 89/0155; A01K 89/033
(52) U.S. Cl. ............................................. 242/289; 188/185
(58) Field of Search ..................... 242/288, 289; 188/185

(56) References Cited

U.S. PATENT DOCUMENTS

| | | | | |
|---|---|---|---|---|
| 5,749,534 | * | 5/1998 | Morimoto | 242/288 |
| 5,803,385 | * | 8/1998 | Baisch | 242/289 |
| 5,950,949 | * | 9/1999 | Cockerham | 242/289 |
| 5,984,221 | * | 11/1999 | Kim | 242/289 |
| 6,003,798 | * | 12/1999 | Kim | 242/289 |
| 6,206,311 | * | 3/2001 | Kim et al. | 242/288 |

* cited by examiner

Primary Examiner—Katherine A. Matecki
(74) Attorney, Agent, or Firm—Shinjyu Global IP Counselors, LLP

(57) ABSTRACT

The present invention relates to a fishing reel that has a variable brake mechanism. The variable brake mechanism includes a plurality of small brake weights mounted on radially extending shafts. The brake weights are positioned within a brake race that is fixed to the fishing reel body. The brake weights are further configured to rotate about a spool shaft with the spool about which fishing line is wound. Upon rotation of the spool, the brake weights are urged radially outward due to centrifugal forces. The brake weights further formed with collars that extend through an opening in a cam collar. The openings in the cam collar define cam surfaces which, upon rotation of the cam collar with respect to the spool, urge the brake weights into and away from a position where the weights may contact the brake race. An adjuster dial accessible from the outer surface of the fishing reel body is configured to selectively engage the cam collar for rotation of the cam collar.

22 Claims, 24 Drawing Sheets

CAM ADJUSTER MECHANISM FOR BRAKE MECHANISM IN FISHING REEL

BACKGROUND OF THE INVENTION

A. Field of the Invention

The present invention relates to a cam adjusting mechanism for use in a brake mechanism of a fishing reel.

B. Description of the Related Art

Brake mechanisms in a fishing reel are known. Such systems are for the purpose of preventing a reel from rotating at too fast a rate when casting out a fishing line. For instance, one such system is known as a Variable Brake System™ manufactured by Shimano Inc. The system includes a reel housing and a brake race fixed to the reel housing. A spool disposed within the reel housing has a brake member fixed thereto such that spool and the brake member rotate together. The brake member is formed with a plurality of retaining portions. A plurality of brake weights are fitted into the retaining portions, one brake weight per retaining portion. The brake weights are forced radially outward and into contact with the brake race in response to rotation of the spool and brake member. As the spool rotates faster, the force exerted on the brake weights increases.

In the above described system, the reel housing is provided with a removable cover which exposes the brake member and brake weights. With the cover removed, the brake weights are exposed and can be moved back and forth within the corresponding retaining portion. In a radially outward position, the brake weights are positioned for engagement with the brake race. In a radially inward position, the brake weight cannot engage the brake race. In this manner, the braking force in the reel can be adjusted.

However, the above described system requires some dis-assembly in order to adjust the braking force provided by the brake weights. A fisherman may want to change the braking force in the reel several times in a single fishing session. Removing and installing the cover and positioning the brake weights can therefore be a burden.

SUMMARY OF THE INVENTION

One object of the present invention is to provide a fishing reel having a Variable Brake System™ with a simpler means of adjusting the braking force provided by braking weights.

In accordance with a first aspect of the present invention, a fishing reel includes an adjusting mechanism for a brake mechanism. The fishing reel further includes a reel body and a spool supported in the reel body for rotation with respect thereto. The brake mechanism is connected to the spool and includes a plurality of brake weights, each of the brake weights formed with a protrusion. A cam collar is formed with at least one convoluted groove, the convoluted groove defining cam surfaces. The protrusion on each of the brake weights extends into the convoluted groove such that in response to rotation of the cam collar with respect to the spool the brake weight is adjusted to one of two radial positions with respect to a central axis about which the spool rotates. A dial is configured for selective engagement with the cam collar and extends out of an opening in the side of the reel body.

The above aspect of the present invention provides a simple way to adjust the position of the brake weights. In particular, adjustment of the position of the brake weights can be effected without dis-assembly of the fishing reel.

Preferably, the brake mechanism further includes a brake shaft holder having a plurality of radially extending shafts. The brake weights are disposed on respective ones of the shafts.

Preferably, a brake race fixed to the reel body proximate the spool and the brake weights are configured for engagement with an inner radial surface of the brake race in response to centrifugal force.

Preferably, the dial is formed with a plurality of protrusions and the reel body is formed with one aperture on a side surface thereof adjacent to the opening through which the dial extends. The dial is configured such that any one of the plurality of protrusions is extendable into the aperture in response to positioning one of the plurality of protrusions adjacent to the aperture.

Preferably, the dial is spring biased into engagement with a side portion of the reel body.

Preferably, the dial is formed with two protrusions having gear teeth formed on a distal end thereof and the protrusions are engagable with gear teeth formed on the cam collar.

Preferably, the brake mechanism further includes a brake shaft holder having a plurality of radially extending shafts and the brake weights are disposed on respective ones of the shafts. The brake shaft holder is also formed with a plurality of axially extending lips that are circumferentially spaced apart from one another. The cam collar is disposed within the axially extending lips and the cam collar is formed with a plurality of radially extending protrusions which contact and engage the lips at least partially restraining relative rotation between the cam collar and the brake shaft holder.

Preferably, the brake mechanism further includes a brake shaft holder having a plurality of radially extending shafts. The brake weights are disposed on respective ones of the shafts. The brake shaft holder is further formed with a central opening having a plurality of recesses that are circumferentially spaced apart from one another. The cam collar is located adjacent to the brake shaft holder and is formed with at least one tab that is engaged with one of the recesses in order to releasably retain the cam collar in position with respect to the brake shaft holder.

As well, it preferably to have a locking member disposed adjacent to the dial. The locking member is formed with gear teeth that are engagable with corresponding gear teeth on the brake shaft holder such that with the locking member engaged with the brake shaft holder, the brake shaft holder and the spool are restrained against rotation.

Preferably, the brake mechanism includes six brake weights and the convoluted groove is configured to adjust one brake weight at a time from an engagement position to a retracted position in response to rotation of the cam collar with respect to the spool.

Alternatively, the brake mechanism includes six brake weights and the convoluted groove is configured to adjust two brake weight synchronously at a time from an engagement position to a retracted position in response to rotation of the cam collar with respect to the spool.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENTS

Figure 1:
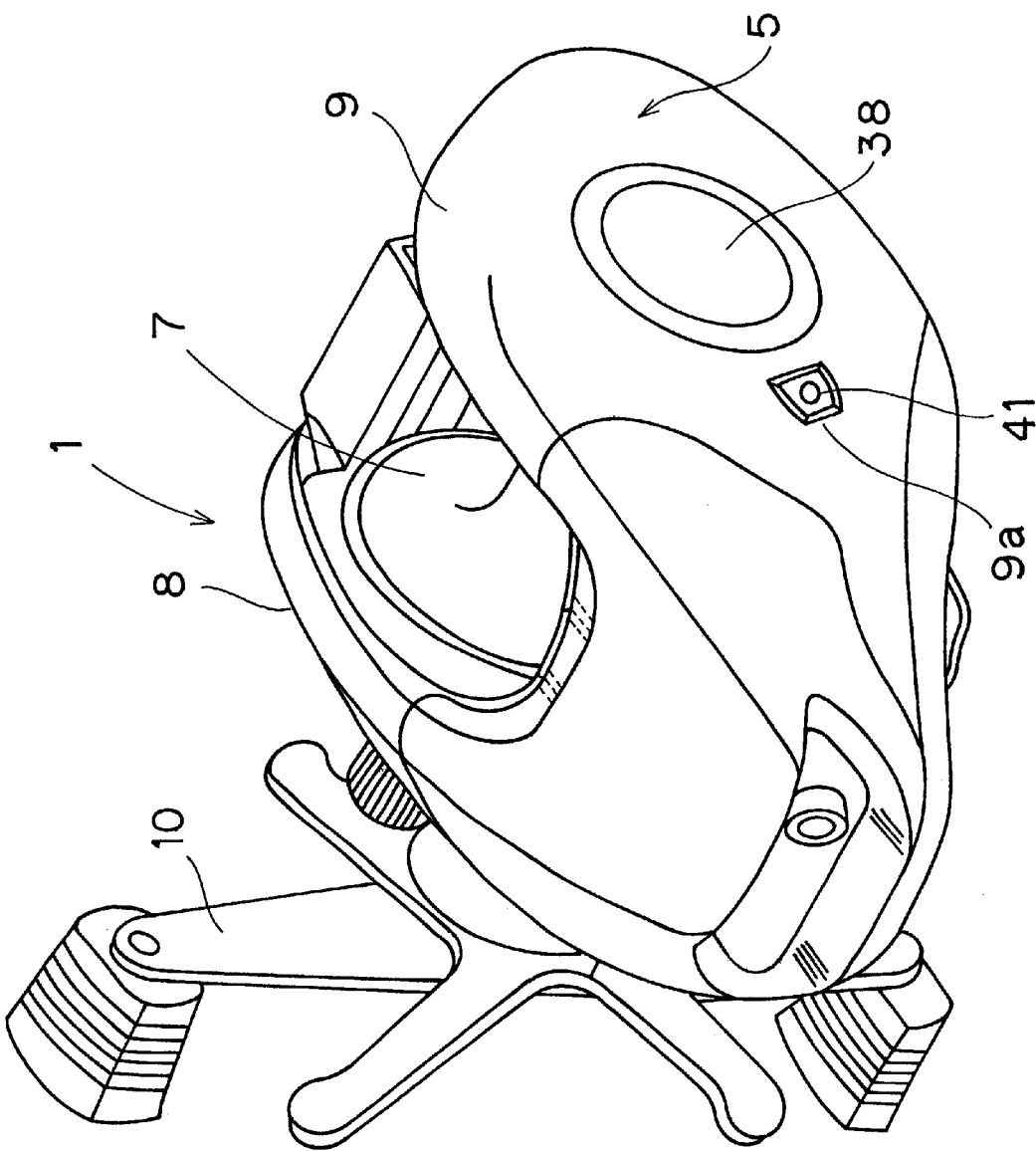
FIG. 1 is a perspective view of a fishing reel in accordance with the present invention.

FIG. 1 shows a fishing reel 1 in accordance with a first embodiment of the present invention. The fishing reel 1 includes a reel body 5 and a spool 7. The spool 7 is supported between side portions 8 and 9 of the reel body 5. The spool 7 is rotatable in response to rotation of a lever 10 via torque transmission gears (not shown).

Figure 2:
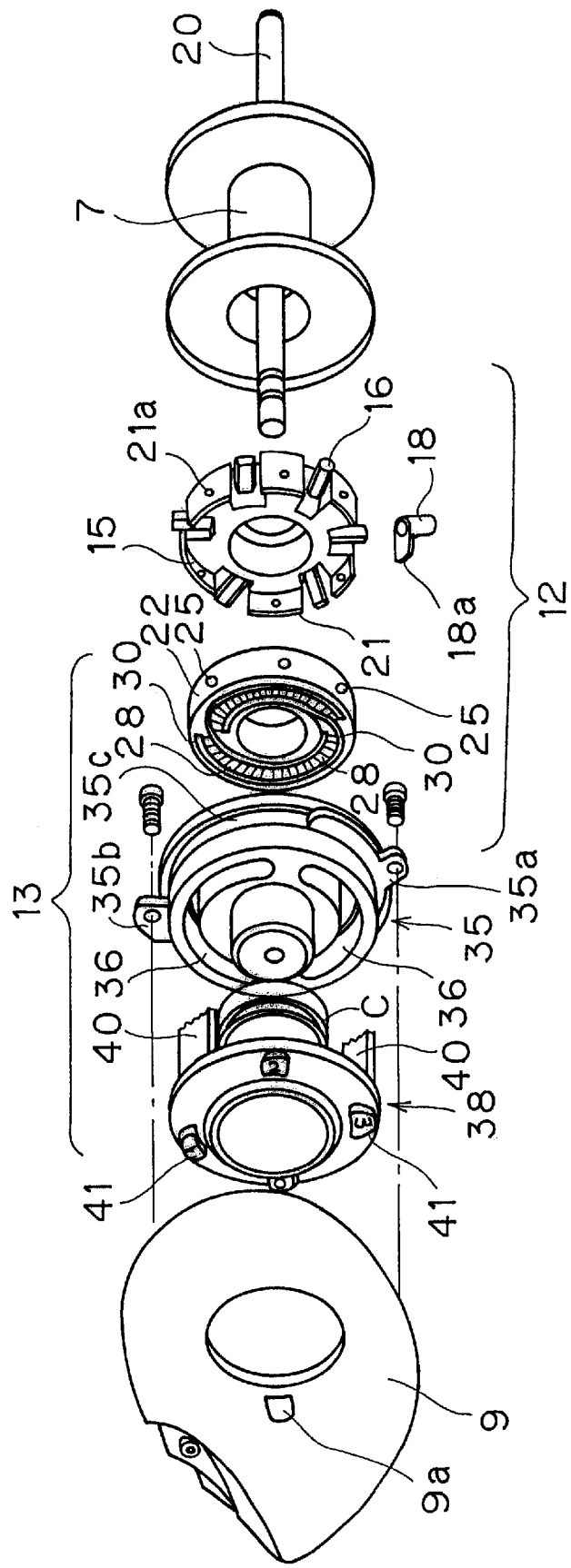
FIG. 2 is an exploded view of portions of the fishing reel depicted in FIG. 1, including a dial adjuster, a cam collar, a brake shaft holder and one of a plurality of brake weights.
Figure 3:
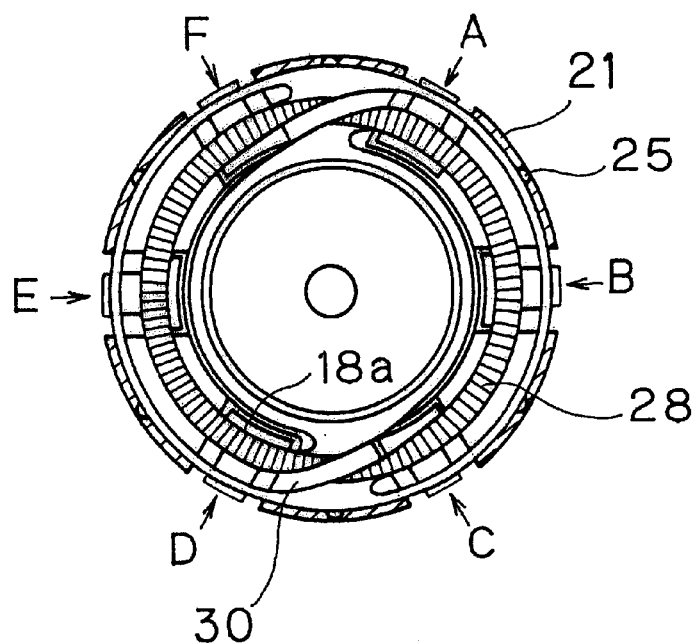
FIGS. 3–6 are elevation views showing only the cam collar, the brake shaft holder and the brake weights depicted in FIG. 2 with the cam collar rotated into a variety of positions with respect to the brake shaft holder for adjusting the positions of the brake weights.
Figure 4:
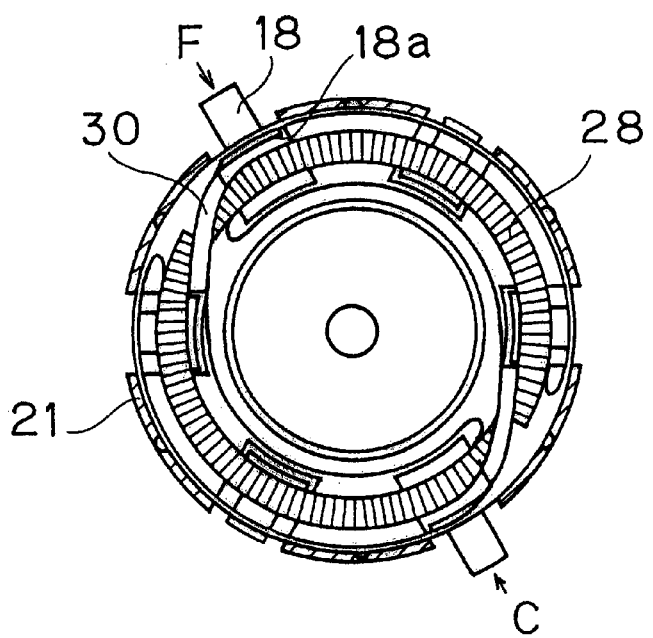
Figure 5:
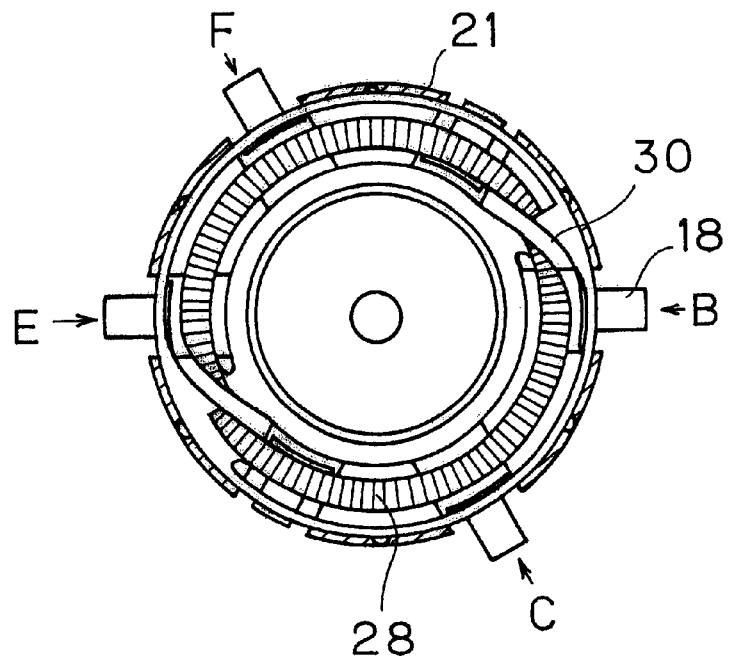

As shown in FIG. 2, the fishing reel 1 includes a brake mechanism 12 and a brake adjusting mechanism 13. The brake mechanism 12 includes a brake shaft holder 15 that is formed with a plurality of shafts 16. There are six shafts 16 depicted in FIG. 2 on the brake shaft holder 15. On each shaft 16 there is a brake weight 18 that slides easily along the length of the shaft 16. It should be appreciated that in FIG. 2 six shafts 16 are shown on the brake shaft holder 15 and only one brake weight 18. In the present invention there is a one to one correspondence between the shafts 16 and the brake weight 18, however, for clarity only one brake weight 18 is shown. Each brake weight 18 is formed with a protrusion 18a.

The spool 7 is mounted on a shaft 20, the shaft 20 being supported in the reel body 5 between the sides 8 and 9. The brake shaft holder 15 is fixed to the shaft 20, as is more clearly shown in FIG. 7, by spline-type gear teeth. The brake shaft holder 15 is formed with a plurality of lips 21 at a radial outer portion thereof. The lips are all circumferentially aligned. A plurality of gaps are defined, one gap being defined between each pair of adjacent lips 21, the shafts 16 being disposed within gaps. Each lip is formed with a hole 21a.

A cam collar 22 is positioned adjacent to the brake shaft holder 15 and is retained radially within the lips 21. The cam collar 22 is formed with a plurality of protrusions 25, the protrusions 25 corresponding to the holes 21a. When the cam collar 22 is properly positioned within the lips 21 of the brake shaft holder 15, the protrusions 25 at least partially extend into the holes 21a thus retaining the cam collar 22 in position. However, as is explained in greater detail below, the cam collar 22 may be rotated with respect to the brake shaft holder 15. Upon rotation of the cam collar 22 with respect to the brake shaft holder 15, the protrusions 25 provide an indication of one position of the cam collar 22 when the protrusions 25 engage the holes 21a.

Figure 8:
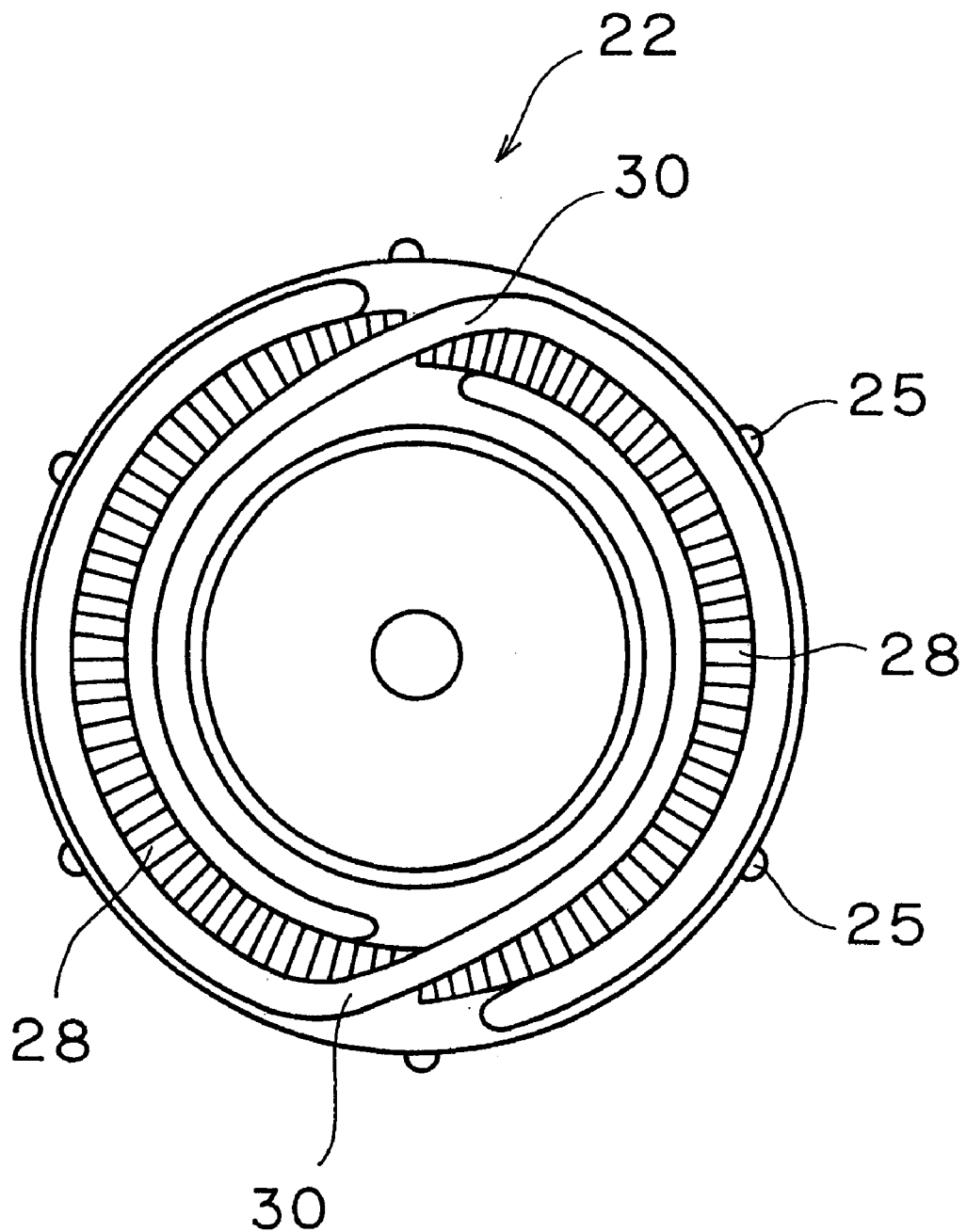
FIG. 8 is an elevation view of the cam collar with other portions of the fishing reel removed to provide greater clarity.

The cam collar 22 is also formed on one surface with a plurality of gear teeth 28. The cam collar 22 is also formed with two partially convoluted openings 30. The surfaces of the openings 30 act as cam surfaces in a manner described below. The gear teeth 28 form an annular ring of gear teeth that are continuous about the surface of the cam collar 22 except where the convoluted openings 30 intersect with the gear teeth 28. In other words, the openings 30 cross through the gear teeth 28 forming two gaps in the gear teeth as is more clearly shown in FIG. 8.

As is shown in FIGS. 3, 4, 5 and 6, the protrusions 18a extend into the openings 30. As will be explained in greater detail below, the cam collar 22 is rotatable with respect to the brake shaft holder 15. Four positions of the cam collar 22 with respect to the brake shaft holder are depicted in FIGS. 3, 4, 5 and 6, as is described below.

The brake adjusting mechanism 13 includes the cam collar 22, a dial case 35 and a dial 38. A coil spring C is disposed between the dial 38 and the dial case 35, as is shown in FIG. 2. The coil spring C urges the dial 38 into contact with the side 9. The dial case 35 includes supports 35a and 35b which extend into an annular groove 35c formed on an outer surface of the dial case 35. Each of the supports 35a and 35b includes an arcuate portion which extends at least 35 degrees around a circumference defined by the groove 35c to restrain the dial case 35 against movement with respect to the reel body 5, but allows the dial case 35 to undergo limited rotation in a manner described further below. The supports 35a and 35b are fixed to the side 9 by screws, as indicated in FIG. 2. The dial case 35 is further formed with two arcuate openings 36.

The dial 38 is formed is formed with two protrusions 40, each protrusion 40 having a plurality of gear teeth formed at a distal end thereof. The protrusions extend through the openings 36 in the dial case 35. As mentioned above, the coil spring C is disposed between the dial 38 and the dial case 35 urging the dial 38 away from the dial case 35 and toward the side 9 of the reel body 5. The dial 38 is also formed with four indicator protrusions 41, each indicator protrusion 41 being formed with a number embossed thereon. The indicator protrusions 41 are shaped to extend through aperture 9a formed in the side 9 of the reel body 5.

The indicator protrusions 41, when extending into the aperture 9a, acts as a lock to prevent the dial 38 from rotating with respect to the side 9. In a state where the coil spring C is urging one of the indicator protrusions 41 into the aperture 9a, the protrusions 40 on the dial 38 are spaced apart from the gear teeth 28 formed in the cam collar 22. However, when the dial 38 is pressed by, for example, the palm of a hand, the coil spring C is compressed allowing the protrusions 40 to engage the gear teeth 28 on the cam collar 22.

Figure 7:
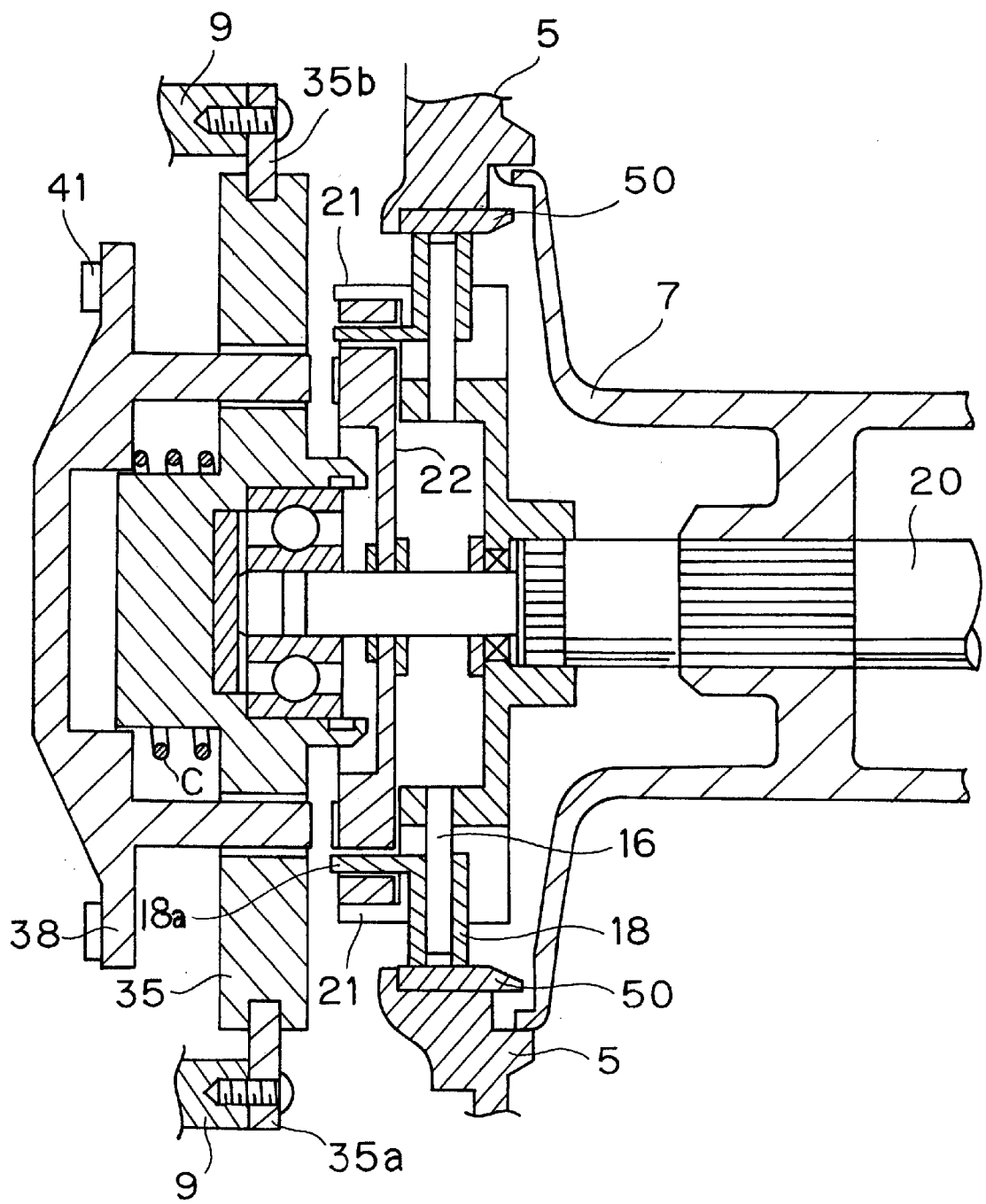
FIG. 7 is a cross section view showing details of the various parts of the fishing reel, dial adjuster, cam collar and brake weights.

As is shown in FIG. 7, a brake race 50 is fixed to a portion of the reel body 5. The brake weights 18 are engagable with an inner radial surface of the brake race 50. A central portion of the brake shaft holder 15 is fixed to the shaft 20 such that the brake shaft holder 15 rotates together with the spool 7 and shaft 20. The cam collar 22 is restrained against axial movement on the shaft 20 by, for example, clips, as shown in FIG. 7. However, the cam collar 22 may freely rotate with respect to the shaft 20. The protrusions 25 that are formed on the cam collar 22 are generally engaged in the holes 21a formed in the lips 21 of the brake shaft holder 15, so therefore, the cam collar 22 is urged to rotate with the spool 7 and the brake shaft holder 15 due to contact between the protrusions 25 and the lips 21 of the brake shaft holder 15.

The fishing reel 1 operates as follows. A fishing line is wound around the spool 7 and may be wound in by rotating the lever 10. When casting out the fishing line, a release mechanism (not shown) is enabled allowing the spool 7 to rotate freely without interference from the gears (not shown) which provide torque to the spool 7 from the lever 10. However, when casting out the fishing line, it is desirable to limit the speed of the spool 7 as fishing line is cast out. Therefore, the brake weights may be adjusted to engage the brake race 50 in response to centrifugal forces acting on the spool 7, brake shaft holder 15 and cam collar 22.

The cam collar 22 may be selectively rotated as follows in order to adjust the number of brake weights 18 which may be positioned for engagement with the brake race 50.

Figure 6:
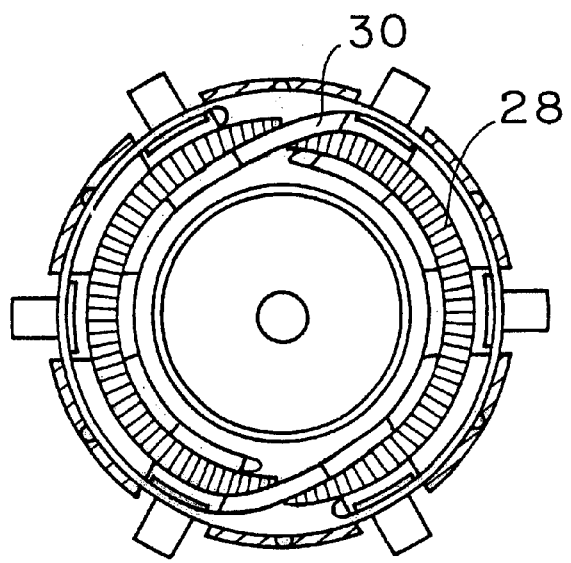

The dial 38 protrudes slightly through an aperture formed in the side 9, as is shown in FIG. 1. A palm of the hand or a finger may be used to press the dial 38 compressing the coil spring C, and causing the gear teeth formed on the ends of the protrusions 40 to come into contact with the gear teeth 28 formed on the cam collar 22. Continuing to press on the dial 38 to maintain contact between the protrusions 40 and the gear teeth 28, the dial 38 may then be rotated causing the cam collar 22 to rotate with the dial 38. The dial 38 and cam collar 22 may be rotated to any of four positions corresponding to the positions of the cam collar 22 with respect to the brake shaft holder 15 shown in FIGS. 3, 4, 5 and 6 respectively. For instance, in FIG. 3, the cam collar 22 is positioned such that the protrusions 18a on each of the brake weights 18 is in a radial inward position due to the orientation of the convoluted openings 30. As the cam collar 22 is rotated to the position shown in FIG. 4, the protrusions 18a on the brake weights 18 in positions F and C are moved to a radial outward position such that the brake weights 18 in positions F and C may engage the brake race 50 in response to centrifugal forces. Similarly, when the cam collar 22 is rotated to the position shown in FIG. 5, the brake weights 18 in the positions B and E are moved to a radial outward position along with the brake weights 18 in positions C and F. Therefore, the brake weights 18 in positions B, C, E and F are all in a radial outward position for engagement with the brake race 50. Similarly, as shown in FIG. 6 all of the brake weights 18 in the positions A, B, C, D, E and F may be positioned in a radial outward position for engagement with the brake race 50.

Since the protrusions 40 extend through the openings 36 in the dial case 35, the dial case 35 may undergo some limited amount of rotation in response to rotation of the dial 38.

As the dial 38 is rotated to move the cam collar 22 to any of the four positions shown in FIGS. 3, 4, 5 and 6, the protrusions 41 align with the aperture 9a. Each of the protrusions 41 on the dial 38 has a number printed or formed on it corresponding to each of the cam collar 22 positions depicted in FIGS. 3, 4, 5 and 6. Therefore, the numbers on the protrusions 41 provide an indication to a fisherman which position the cam collar 22 is located in, and consequently, how many brake weights 18 are positioned for engagement with the brake race 50.

In accordance with the present invention, a simple, convenient means is provided for a fisherman to adjust the braking force on a spool during casting. Further, the means to adjust the braking force also includes an indication of the number of braking weight that are positioned for providing braking force. As well, the means to adjust the braking force does not require disassembly of the fishing reel nor does adjustment require opening of a panel on the fishing reel.

In an alternate embodiment, the brake race 50 may be fixed to the dial case 35. The dial case 35 may undergo some relative rotary displacement with respect to the supports 35a and 35b, as described above. However, rotation of the dial case 35 is restricted by engagement with the protrusions 41 of the dial 38, and rotation of the dial 38 is restricted by the engagement between the protrusion 41 and the aperture 9a in the side 9. Therefore, if the brake race 50 is fixed to the dial case 35 engagement with the brake weights 18 still provides braking force for the spool 7.

Figure 9:
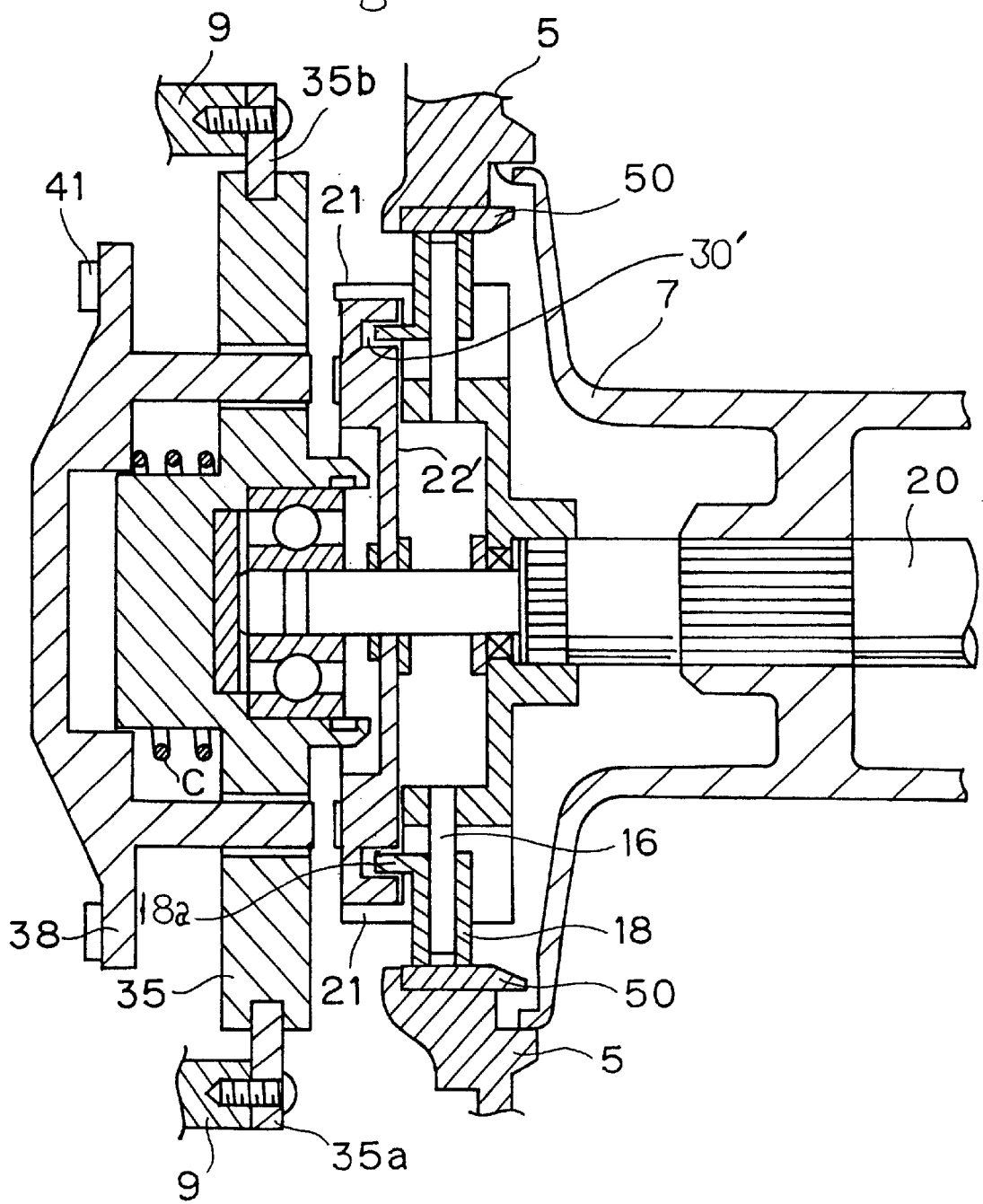
FIG. 9 is a cross section view, similar to FIG. 7, showing details of the various parts of the fishing reel that includes a cam collar and brake weights in accordance with a second embodiment of the present invention.
Figure 10:
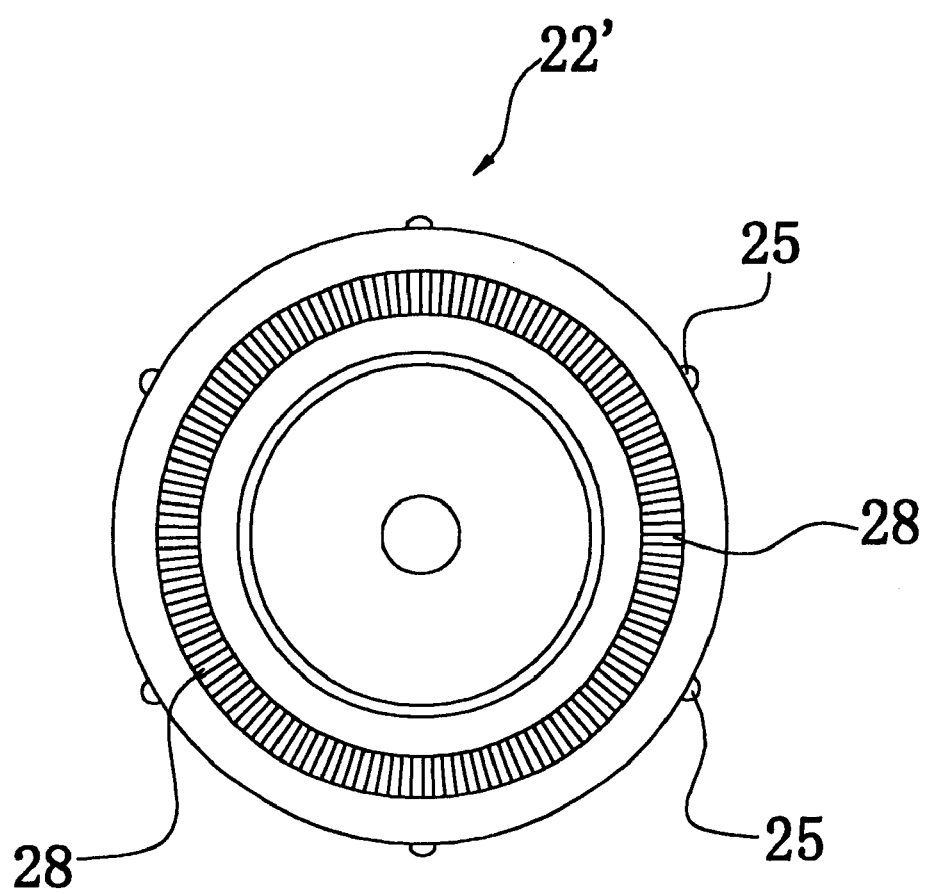
FIG. 10 is an elevation view of a first side of the cam collar depicted in FIG. 9, shown removed from the fishing reel.
Figure 11:
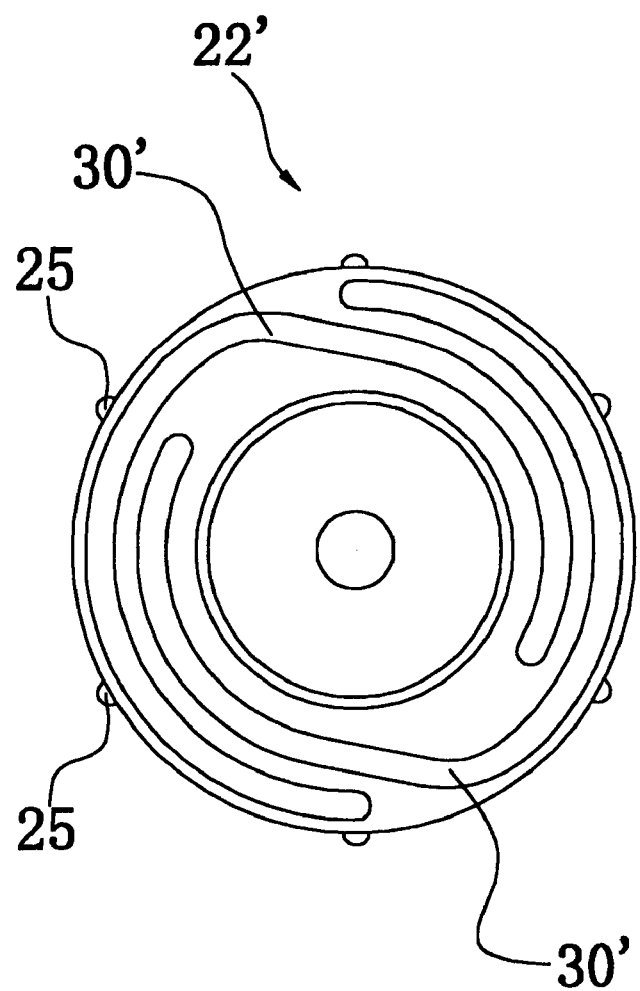
FIG. 11 is an elevation view of a second side of the cam collar depicted in FIGS. 9 and 10, shown removed from the fishing reel.

In a second embodiment, a cam collar 22' may be used in place of the cam collar 22 described above. In the cam collar 22 there is a convoluted opening 30. In the second embodiment, the convoluted opening 30 is replaced with a convoluted groove 30', as shown in FIGS. 9, 10 and 11. Specifically, the cam collar 22' is formed with gear teeth 28 in a manner similar to that described above on one side of the cam collar 22', as shown in FIG. 10. A second side of the cam collar 22' is formed with the convoluted groove 30' which has generally the same shape as the convoluted opening 30 described above. In the second embodiment, the protrusions 18a extend into the convoluted groove 30' in a manner similar to that described above with respect to the first embodiment.

A third embodiment of the present invention is depicted in FIGS. 12, 13A, 13B, 13C, 14A, 14B, 14C, 15, 16, 17A, 17B, 17C, 17D, 17E, 17F and 17G.

In the third embodiment, a fishing reel is provided with a brake adjusting mechanism.

Figure 12:
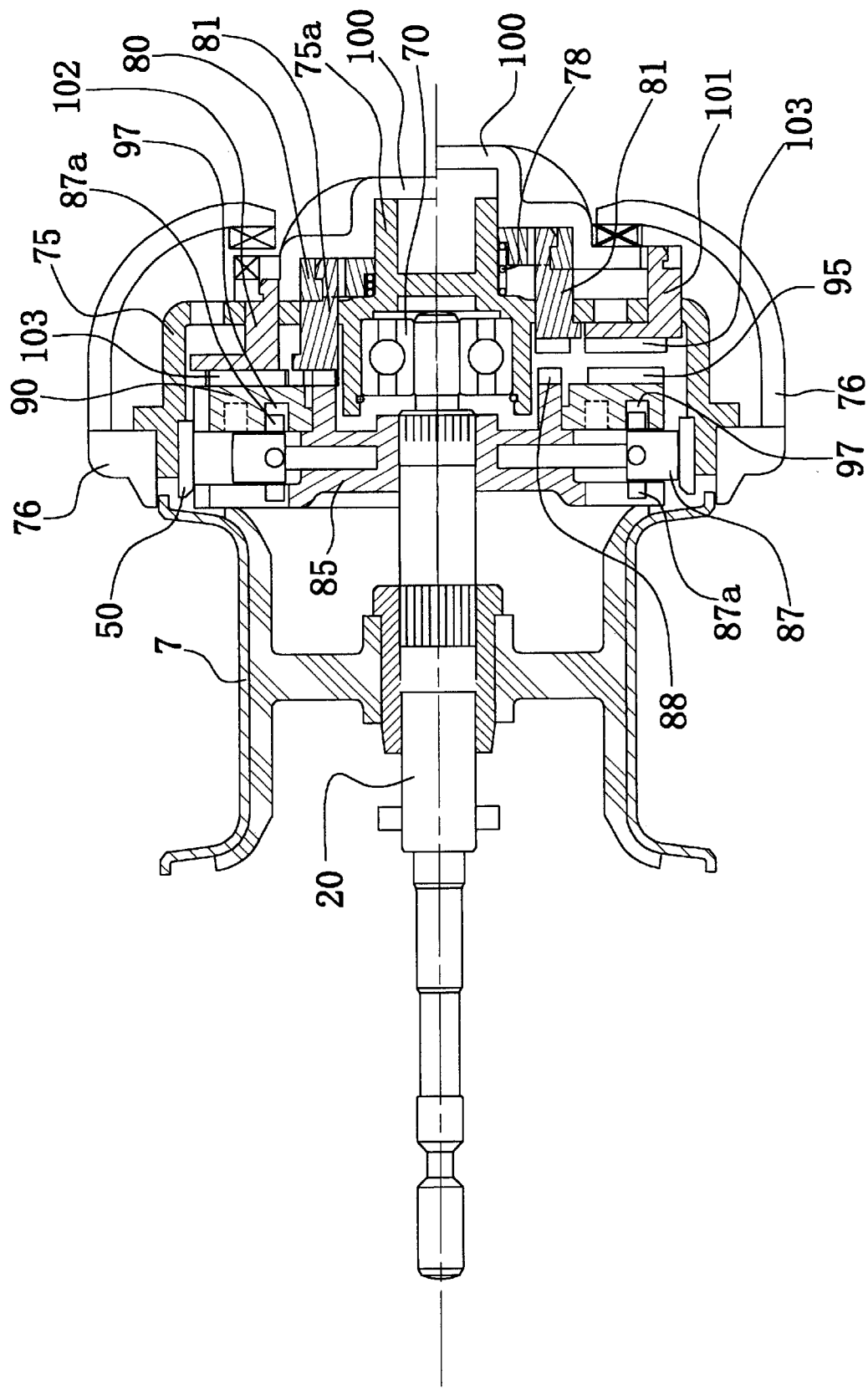
FIG. 12 is a side cross-section view of a fishing reel in accordance with a third embodiment of the present invention with portions of the fishing reel housing removed.

As shown in FIG. 12, with portions of the housing removed to provide greater clarity, the spool 7 is supported on a spool shaft 20. One end of the spool shaft 20 is supported by a bearing 70. The bearing 70 is supported within a central opening of a dial case 75. The dial case 75 is fixed to a side housing member 76.

Figure 16:
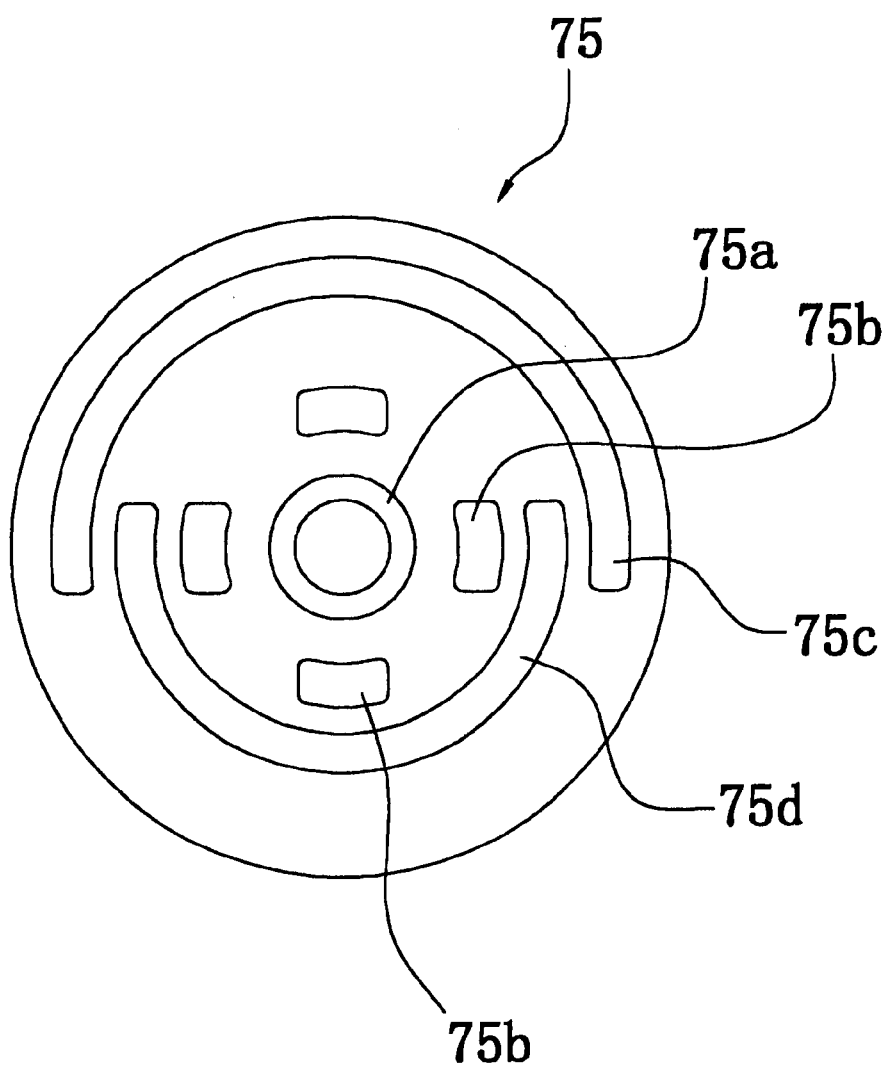
FIG. 16 is an end view of a dial case shown removed from the fishing reel depicted in FIG. 12.

The dial case 75 is formed with a central hub 75a and elongated arcuate openings 75b, 75c and 75d, as is shown more clearly in FIG. 16. As can be seen in FIG. 16, there are four openings 75b, one opening 75c and one opening 75d. The purpose and function of the openings 75b, 75c and 75d are described in greater detail below.

A coil spring 78 is disposed about the hub 75a of the dial case 75. The coil spring 78 engages an inner surface of a locking member 80. The locking member 80, as shown in FIG. 12, includes legs 81. There are four legs 81 circumferentially spaced apart from one another, although only two legs 81 are depicted in FIG. 16.

In FIG. 16, the locking member 80 is shown in two positions. In the lower half of FIG. 16, the locking member 80 is shown in a released position. The coil spring 78 urges the locking member 80 into the release position. The legs 81 each extend through a corresponding one of the openings 75b of the dial case 75.

Figure 15:
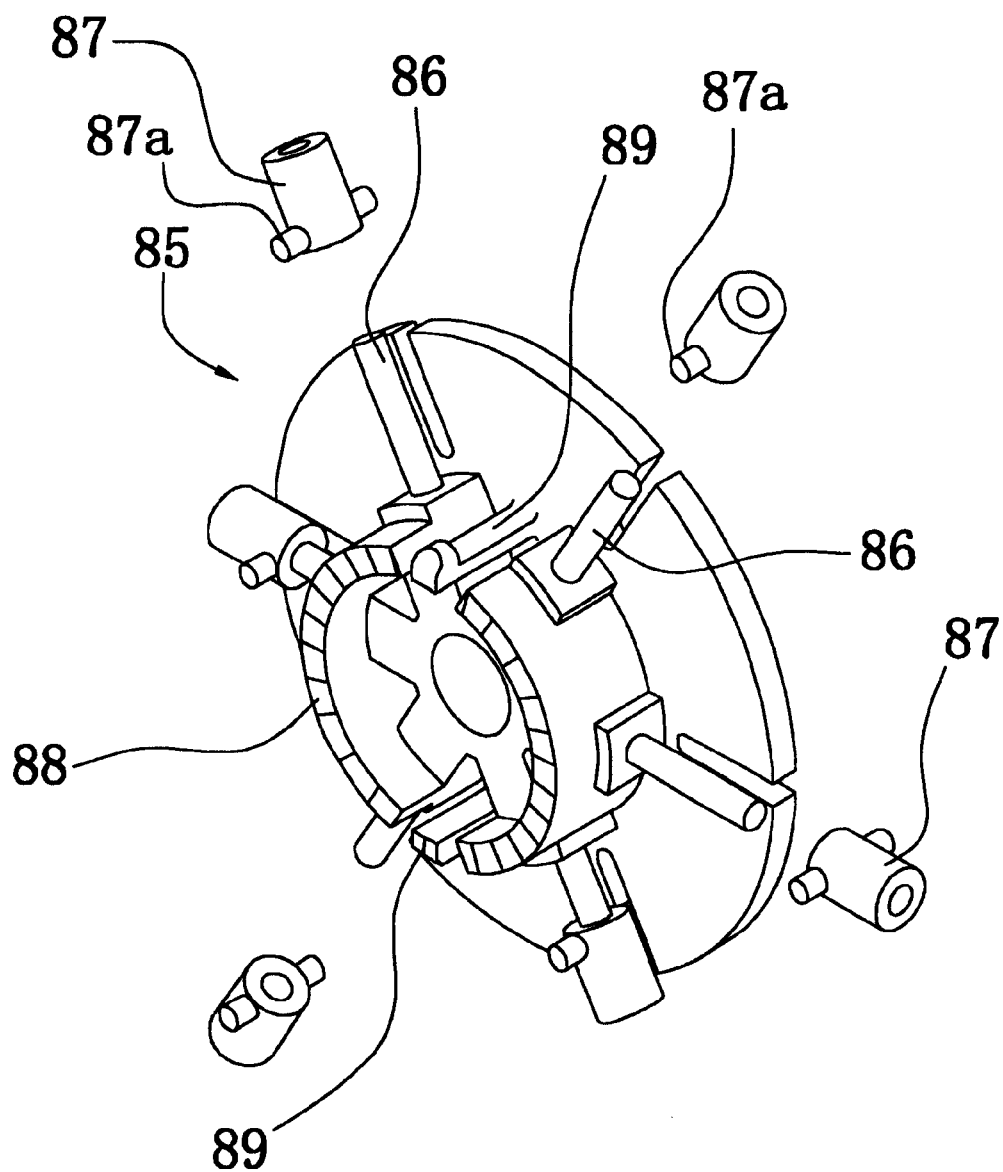
FIG. 15 is a perspective view of the brake shaft holder with brake shafts and brake weights, all shown removed from the fishing reel depicted in FIG. 12.

A brake shaft holder 85 is fixed to one end of the spool shaft 20 and therefore rotates with the spool 7. The brake shaft holder 85 is similar to those described above with respect to the first and second embodiments. For instance, the brake shaft holder 85 includes six brake shafts 86, each being equidistantly spaced apart from one another in a circumferential direction, as shown in FIG. 15. One brake weight 87 is disposed on each of the brake shafts 86. The brake weights 87 are free to slide along on the brake shafts 86. The brake shaft holder 85 is also formed with recesses 85a. Each brake weight 87 is formed with protrusions 87a. One protrusion 87a of each brake weight 87 extends into an adjacent recess 85a. Thus, although the brake weight 87 may slide along the brake shaft 86, the brake weight 87 may not rotate about the brake shaft 86.

Figure 14A:
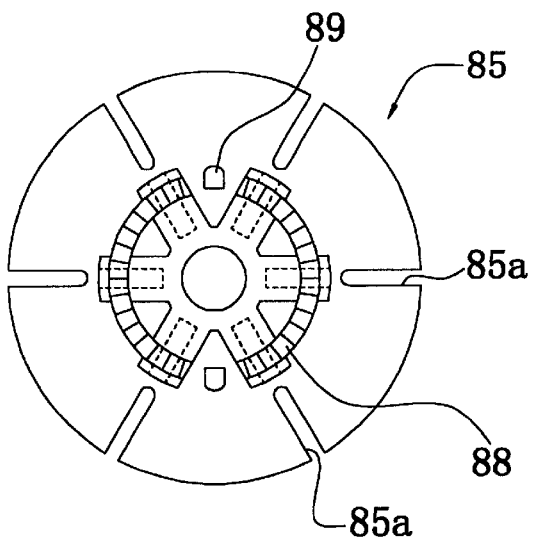
FIGS. 14A, 14B and 14C are front, first side and second side views, respectively, of a brake shaft holder shown removed from the shown removed from the fishing reel depicted in FIG. 12.
Figure 14B:
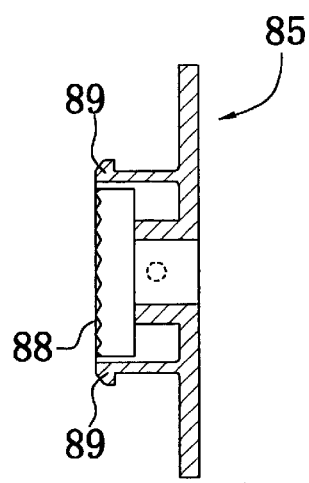
Figure 14C:
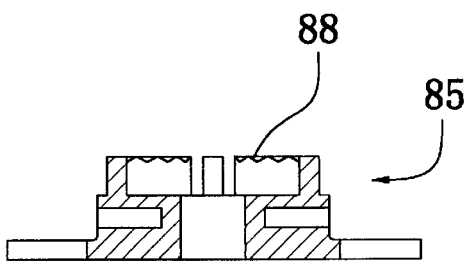

The brake shaft holder 85 is depicted in FIGS. 14A, 14B and 14C with the brake shafts and brake weights removed to provide greater clarity. However, in FIG. 15, the brake shafts 86 and brake weights 87 are shown.

In the upper half of FIG. 12, the locking member 80 is shown in a locked position. In the locked position, the legs 81 of the locking member 80 engage gear teeth 88 formed on a portion of the brake shaft holder 85. When the legs 81 of the locking member 80 are engaged with the gear teeth 88 of the brake shaft holder 85, since the legs 81 extend through the openings 75b of the dial case 75, the brake shaft holder 85, the spool 7 and the spool shaft 20 are not able to rotate.

A cam collar 90 engages the brake shaft holder 85. The cam collar 90 is retained in place beside the brake shaft holder 85 by tabs 89. The tabs 89 engage recesses 91 formed on the cam collar 90. However, the cam collar may rotate with respect to the brake shaft holder 85 in a manner described in greater detail below. Engagement between the tabs 89 and the recesses 91 provide a releasable retaining mechanism for retaining the cam collar 90 in position with respect to the brake shaft holder 85, as is described in greater detail below.

Figure 13C:
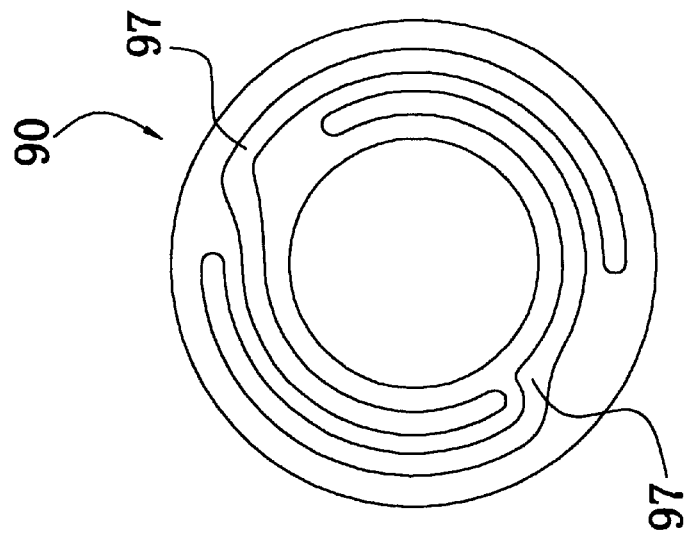
FIG. 13A, 13B and 13C are front, side and rear views, respectively, of a cam collar shown removed from the fishing reel depicted in FIG. 12.
Figure 13B:
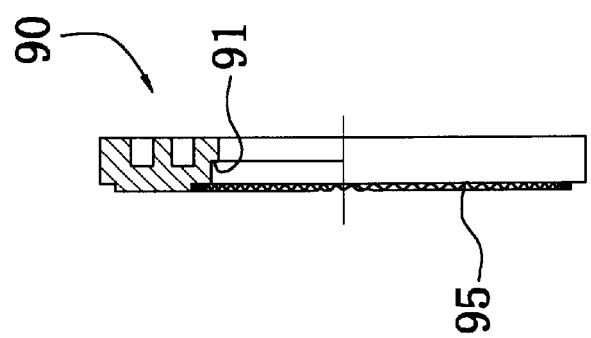
Figure 13A:
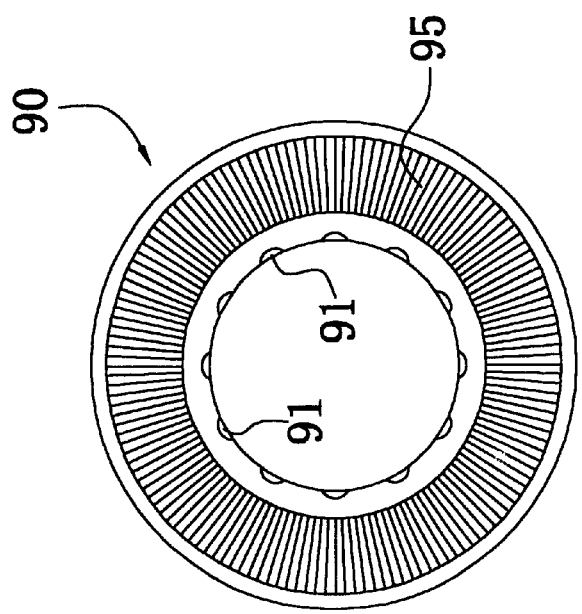

The cam collar 90 is shown removed from the fishing reel in FIGS. 13A, 13B and 13C. As is shown in FIGS. 12, 13A and 13B, the cam collar 90 is formed with gear teeth 95. As shown in FIGS. 12, 13B and 13C, the cam collar 90 is also formed with two cam recesses 97. As is shown in FIG. 12, one protrusion 87a from each of the brake weights 87 extends into a corresponding cam recess 97. There are two generally symmetrical cam recesses 97 (symmetrical about a center point of the cam collar 90), each cam recess 97 being in the form of a convoluted groove.

An adjuster knob 100 is fitted within the side cover 76 and at least partially extends out a central opening in the cover 76. The knob 100 extends around the hub 75a of the dial case 75 and is free to rotate with respect to the dial case 75. The knob 100 includes legs 101 and 102. The leg 101 extends through the opening 75d and the leg 102 extends through the opening 75c in the dial case 75. As shown in FIG. 16, the openings 75c and 75d have an arcuate length of over 180°. The legs 101 and 102 are relatively small with respect to the arcuate length of the openings 75c and 75d. Therefore, the knob 100 is free to rotate within the confines of the arcuate length of the openings 75c and 75d. Specifically, the knob 100 may rotate about a circumferential distance of at least 180°.

The coil spring 78 which biases the locking member 81 into the release position also biases the knob 100 into a release position, since the knob 100 engages the locking member 81.

The legs 101 and 102 are each formed with gear teeth 103. As shown in the upper half of FIG. 12, the knob 100 may be depressed into an engagement position such that the gear teeth 103 engage the gear teeth 95 on the cam collar 90.

The operation of the brake adjusting mechanism in accordance with the third embodiment operates as follows. The knob 100 is depressed such that the knob 100, the legs 101 and 102 are depressed into engagement with the gear teeth 95 on the cam collar 90. Also, pressing the knob 100 inward causes the locking member 80 to move into the locked position. In the locked position, the legs 81 of the locking member 80 engage the gear teeth 88 of the brake shaft holder 85 thus preventing the brake shaft holder 85 from rotating. However, the knob 100 may rotate while in the engagement position depicted in the upper half of FIG. 12.

When the knob 100 is rotated in the engagement position (upper half of FIG. 12), the position of the brake weights 87 may be adjusted as follows. Since the gear teeth 103 of the legs 101 and 102 of the knob 100 engage the gear teeth of the cam collar 90 in the engagement position, rotation of the knob 100 causes rotation of the cam collar 90. The cam collar 90 may be rotated into various positions depicted in FIGS. 17A, 17B, 17C, 17D, 17E, 17F and 17G, and the cam collar 90 is retained in position with respect to the brake shaft holder 85 by the engagement between the tabs 89 and the recesses 91.

Figure 17B:
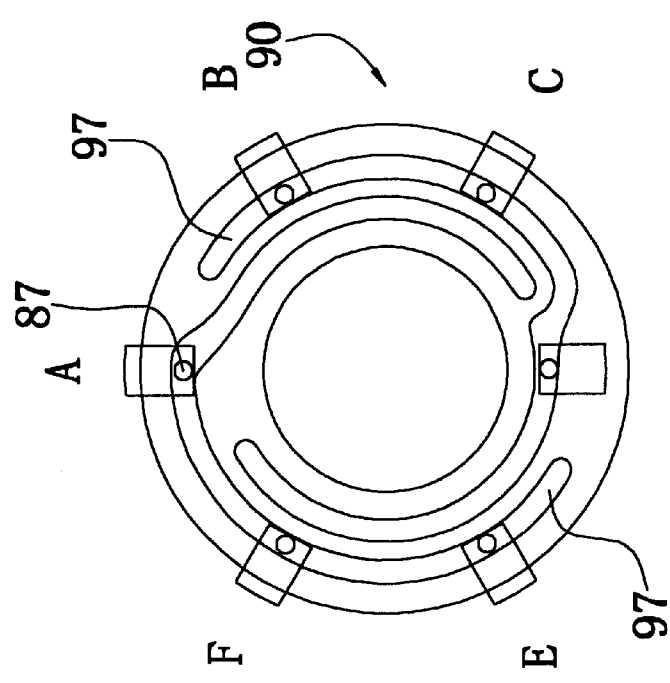
FIGS. 17A, 17B, 17C, 17D, 17E, 17F and 17G are end views showing the cam collar and brake weights depicted in FIGS. 12, 13A, 13B, 13C and 15, with the cam collar is rotated into various positions.
Figure 17A:
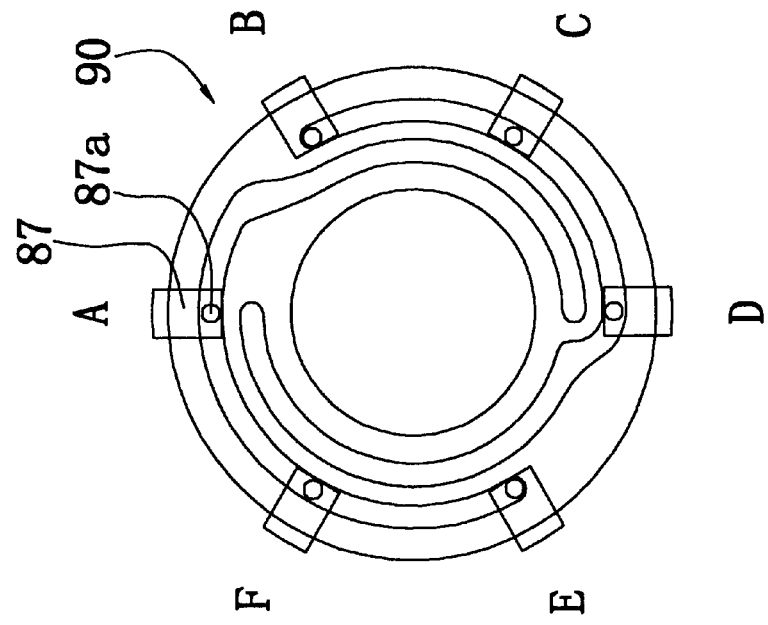

As shown in FIG. 17A, each of the brake weights 87 has one protrusion 87a extending into a corresponding one of the cam recesses 97. In FIG. 17A, all of the brake weights 87 are in an outward position such that upon rotation of the spool 7, the brake weights 87 are urged outward by centrifugal forces into engagement with the braking race 50.

Figure 17D:
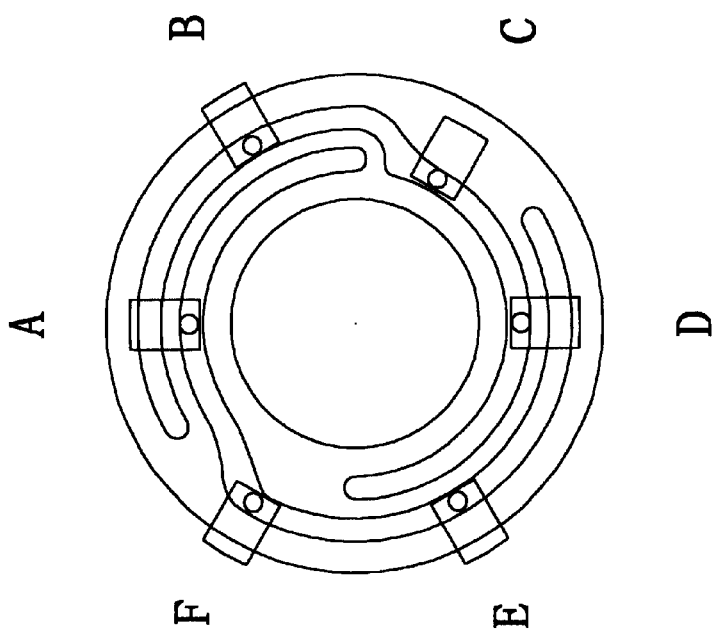
Figure 17C:
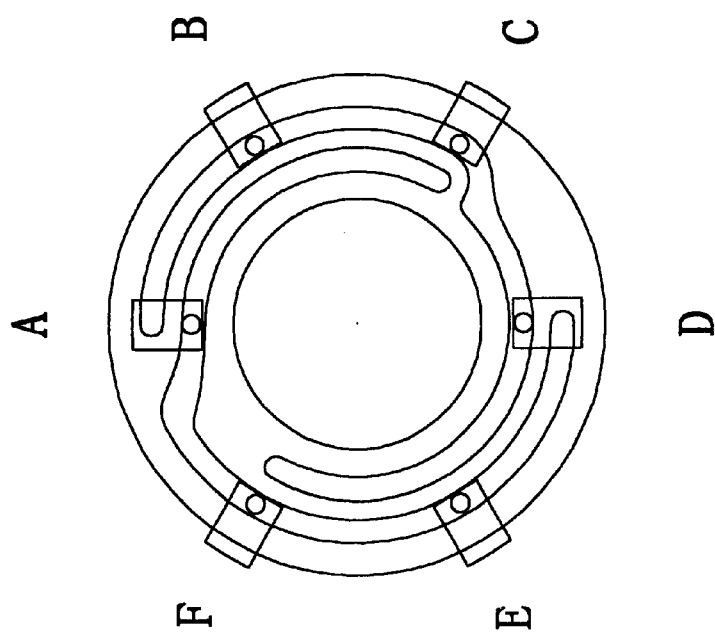
Figure 17F:
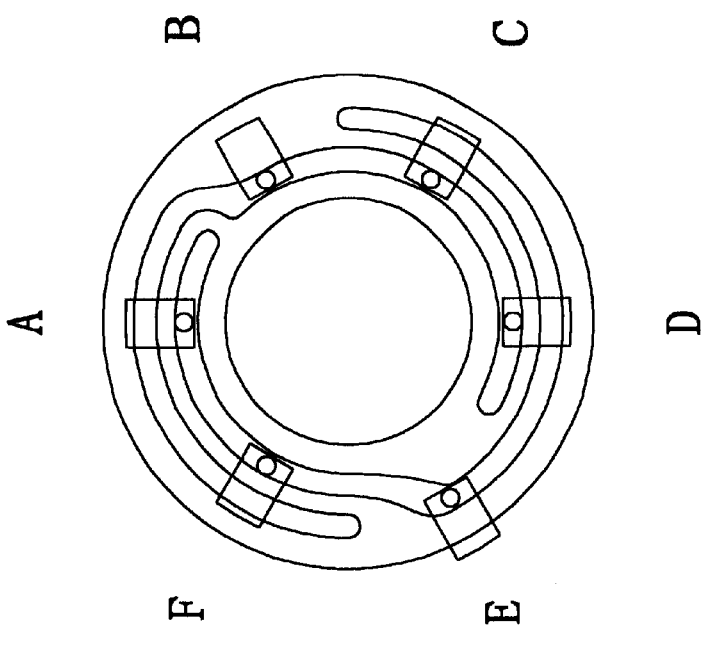
Figure 17E:
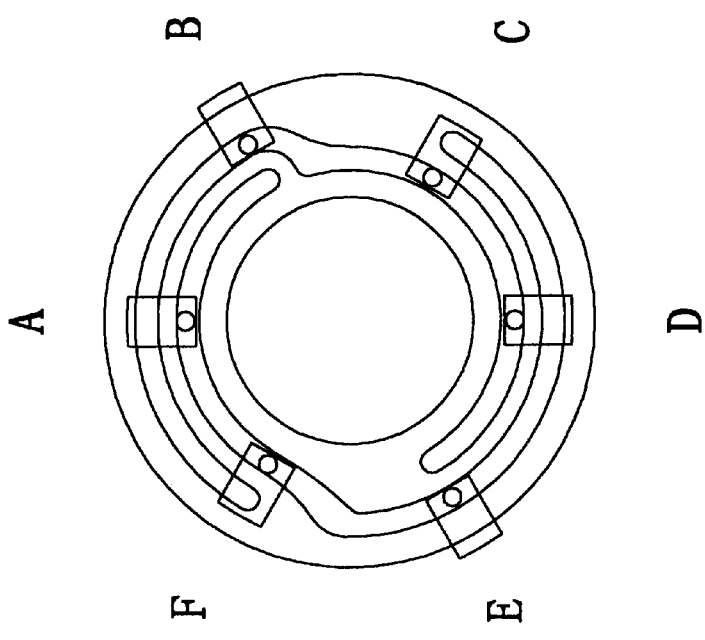
Figure 17G:
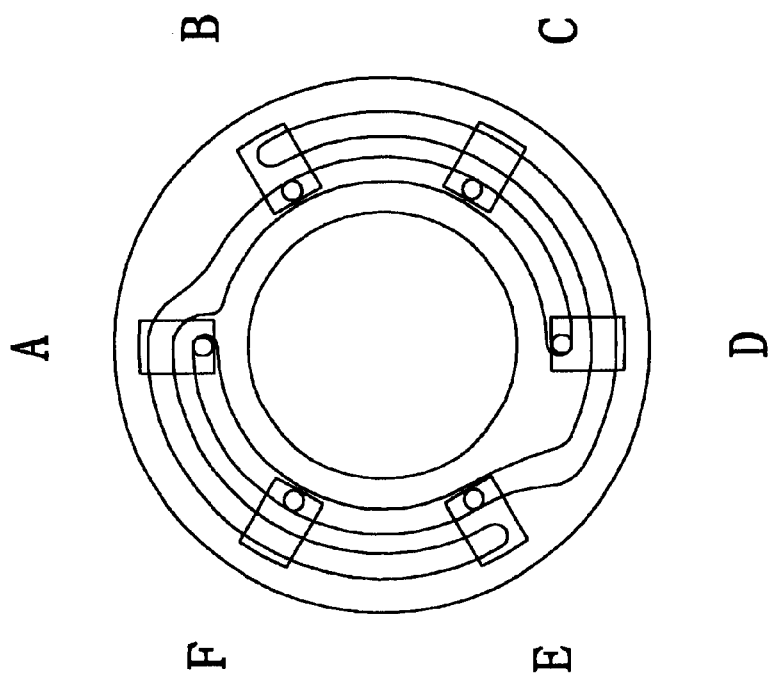

When the knob 100 pushed in and turned, the cam collar 90 may be rotated in 30° increments to, for instance, the position shown in FIG. 17B, where the brake weight 87 in the position D is retracted radially inward. In the retracted position, the brake weight 87 in position D in FIG. 17B cannot engage the brake race 50 upon rotation of the spool 7. Similar successive rotation of the cam collar 90 in 30° increments causes one by one retraction of each of the brake weights 87. Specifically, as shown in FIG. 17C, the brake weights 87 in positions A and D are now retracted. In FIG. 17D, the brake weights in positions A, D and C are retracted. A further 30° rotation from the position in FIG. 17D to the position depicted in FIG. 17E retracts the brake weights in positions A, D, C and F. Another 30° rotation, as depicted in FIG. 17F causes the brake weights 87 in positions A, B, C, D and F to be retracted. Finally in the position depicted in FIG. 17G, all of the brake weights 87 are retracted. Reverse rotation of the knob 100 causes the cam collar 90 to urge, one by one, each of the brake weights 87 back into braking position.

One advantage of the third embodiment is that a fisherman may select any one of a variety of settings, each setting providing a different level of braking force applied to the spool 7 because any number (between 0 and 6) of brake weights 87 can put into the engagement position.

In the third embodiment described above, the cam collar 90 must be rotated about 180° in order to adjust all of the brake weights 87 from an engagement position to the retracted or dis-engagement position. This provides an easy way to adjust the braking action of the spool. However, in yet another embodiment of the present invention, a cam collar may be provided which reduces the total angular displacement required to adjust the number of braking weights that are in an engagement position.

A cam collar 120 in accordance with a fourth embodiment of the present invention is depicted in FIGS. 18A, 18B, 18C, 18D, 18E, 18F and 18G. The cam collar 120 may be installed in the fishing reel depicted in FIG. 12. Operation and adjustment of the cam collar 120 is the same as the cam collar 90, except that the cam collar 90 and cam collar 120 have different shaped and sized cam recesses. Specifically, the cam recesses 125A, 125B, 125C, 125D, 125E and 125F are configured such that the cam collar 120 need only be rotated about 60° in order to adjust all of the brake weights 87 from an engagement position to the retracted or dis-engagement position.

Figure 18A:
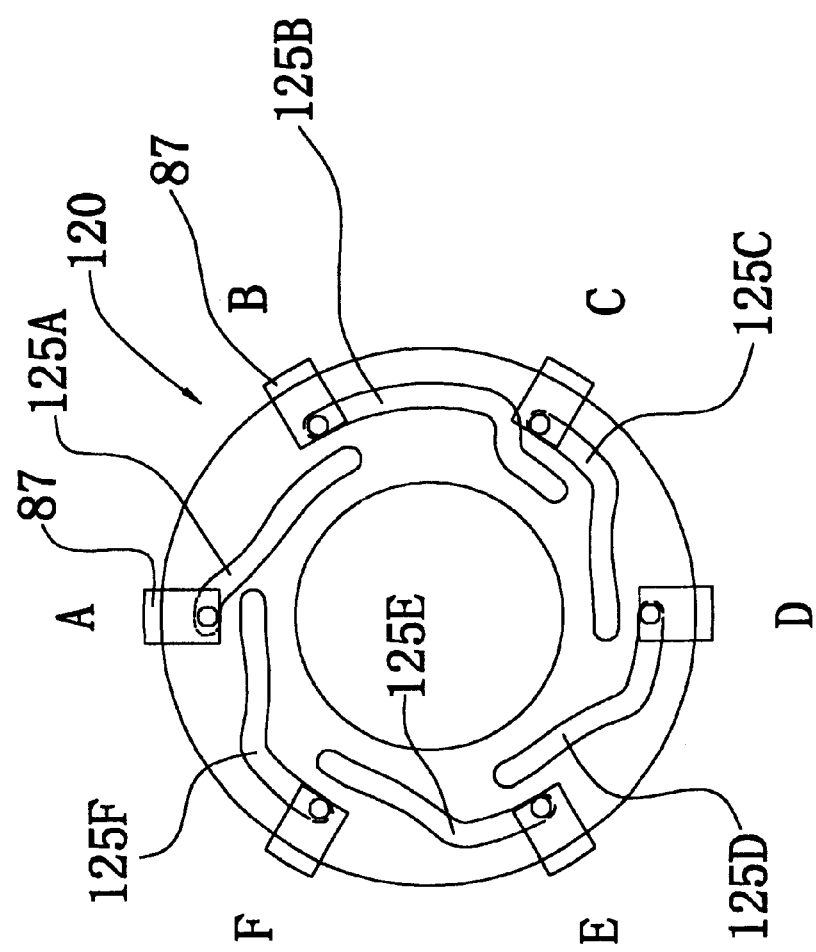
FIGS. 18A, 18B, 18C, 18D, 18E, 18F and 18G are end views showing a cam collar and brake weights in accordance with a fourth embodiment of the invention, with the cam collar is rotated into various positions.
Figure 18C:
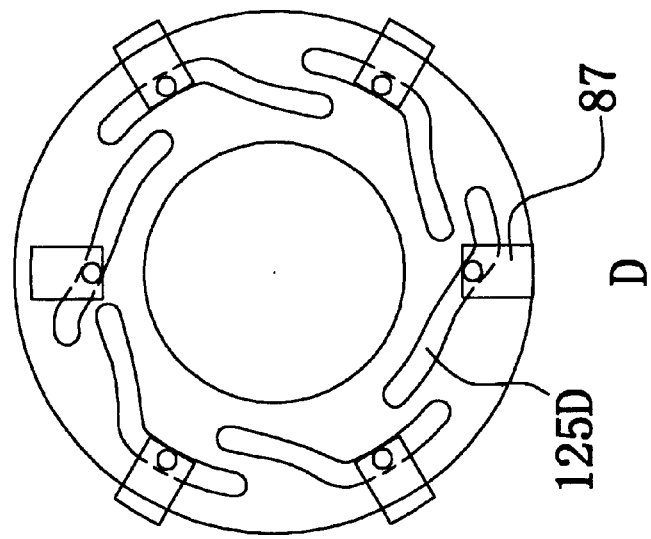
Figure 18B:
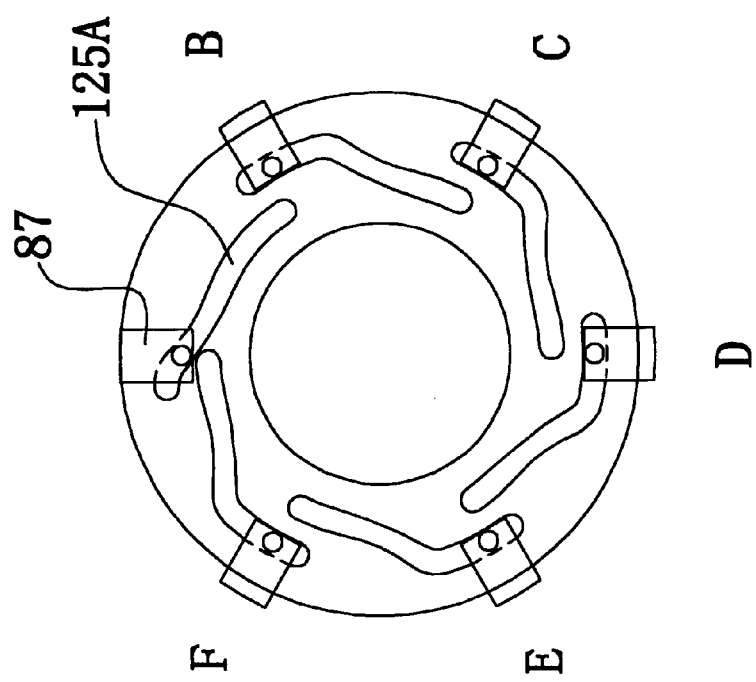

In FIG. 18A, the cam collar 120 is positioned such that all of the brake weights 87 are in an engagement position for engagement with the brake race 50. In FIG. 18B, the cam collar 120 has been rotated 10° (compared to the position in FIG. 18A). In FIG. 18B, the brake weight 87 in position A has been retracted due to engagement with the cam recess 125A. In FIG. 18C, the cam collar 120 has been rotated 20° (compared to the position in FIG. 18A) and as a result, the brake weight 87 in position D has moved into the retracted position due to engagement with the cam recess 125D.

Figure 18E:
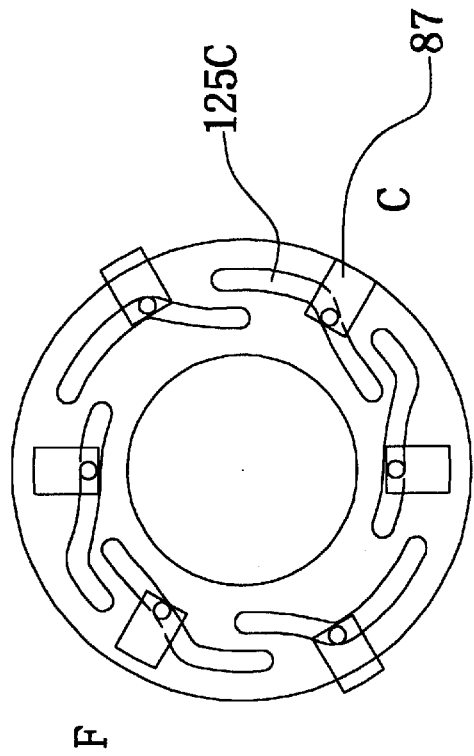
Figure 18D:
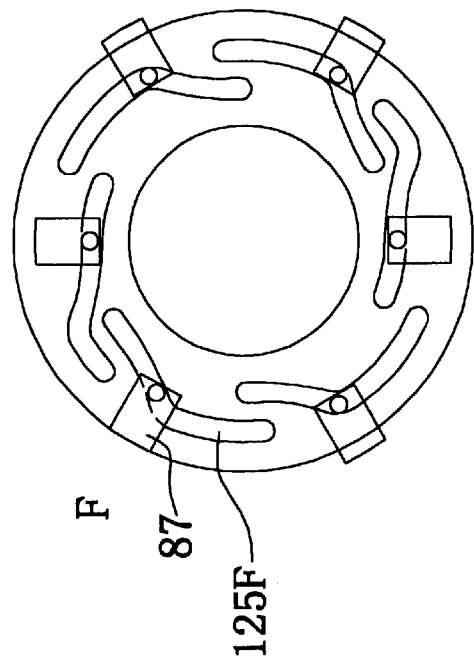
Figure 18G:
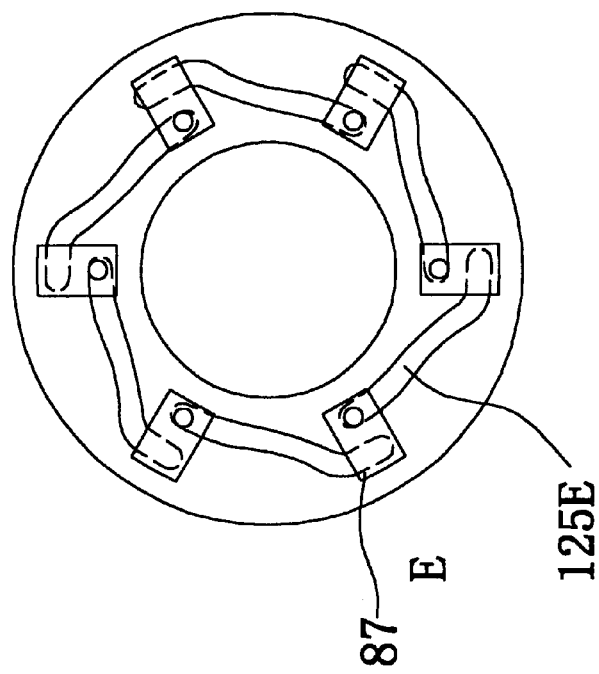
Figure 18F:
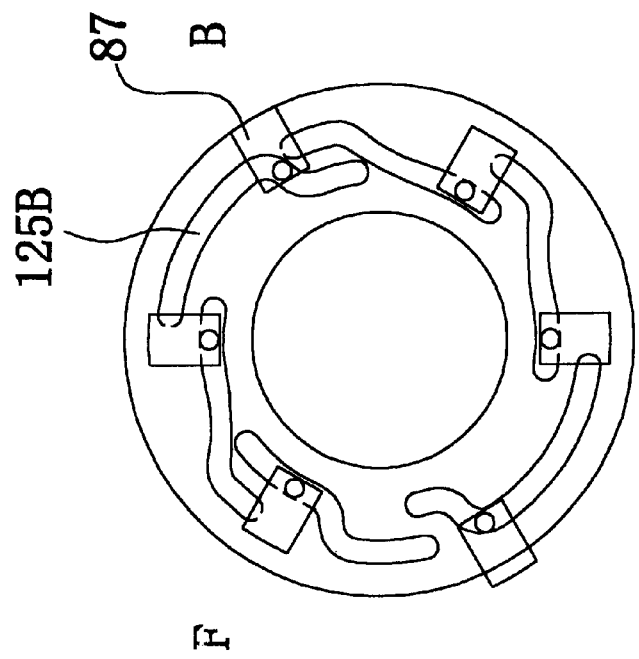

In FIG. 18D, the cam collar 120 has been rotated 30° (compared to the position in FIG. 18A) and as a result, the brake weight 87 in position F has moved into the retracted position due to engagement with the cam recess 125F. In FIG. 18E, the cam collar 120 has been rotated 40° (compared to the position in FIG. 18A) and as a result, the brake weight 87 in position C has moved into the retracted position due to engagement with the cam recess 125C. In FIG. 18F, the cam collar 120 has been rotated 50° (compared to the position in FIG. 18A) and as a result, the brake weight 87 in position B has moved into the retracted position due to engagement with the cam recess 125B.

Finally, as shown in FIG. 18C, the cam collar 120 has been rotated 60° (compared to the position in FIG. 18A) and as a result, the brake weight 87 in position E has moved into the retracted position due to engagement with the cam recess 125E.

An advantage of the fourth embodiment depicted in FIGS. 18A, 18B, 18C, 18D, 18E, 18F and 18G is that the total amount of rotation of the adjuster knob 100 necessary to adjust the position of the brake weights 87 is reduced. It should be appreciated in the fourth embodiment that the arcuate length of the openings 75c and 75d in the dial case 75 may be reduced, since the amount of rotation of the legs 102 and 102 of the adjuster knob 100 is correspondingly reduced.

Figure 20:
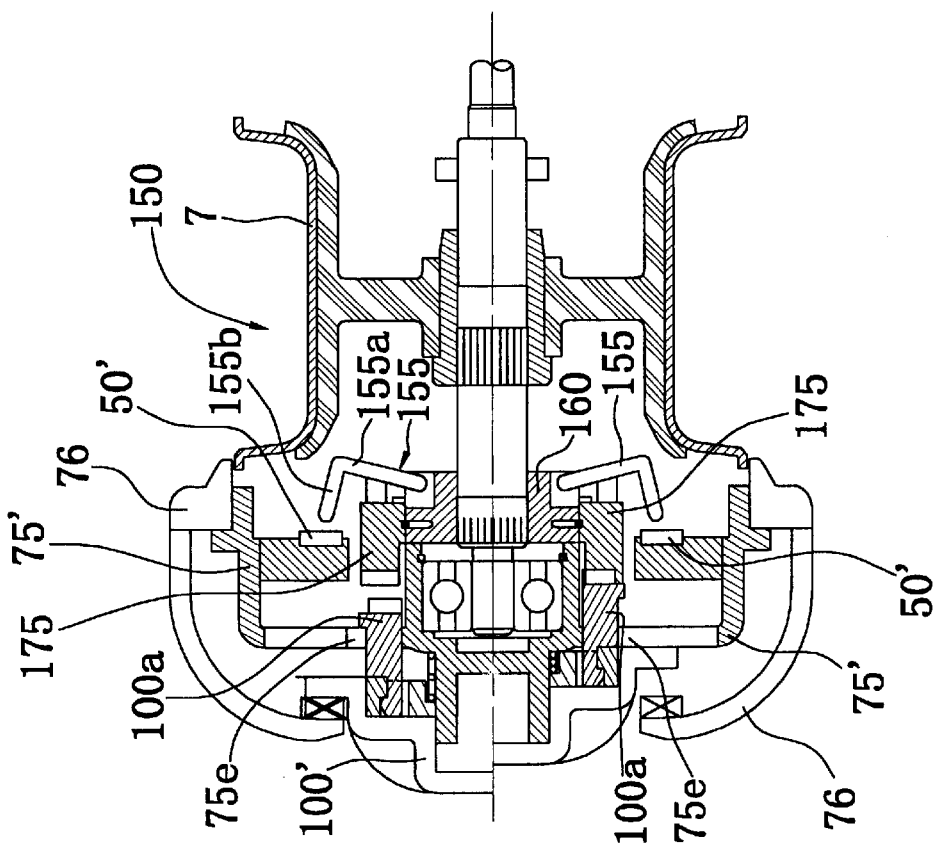
FIG. 20 is an end view of a cam collar shown removed from the fishing reel depicted in FIG. 19.
Figure 19:
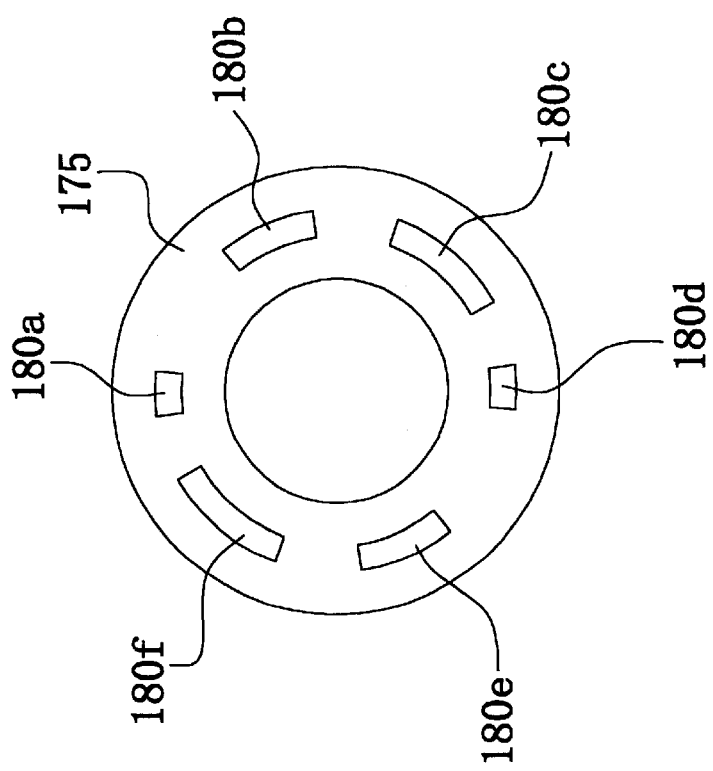
FIG. 19 is a fragmentary, cross-section of a fishing reel in accordance with a fifth embodiment of the present invention.
Figure 21:
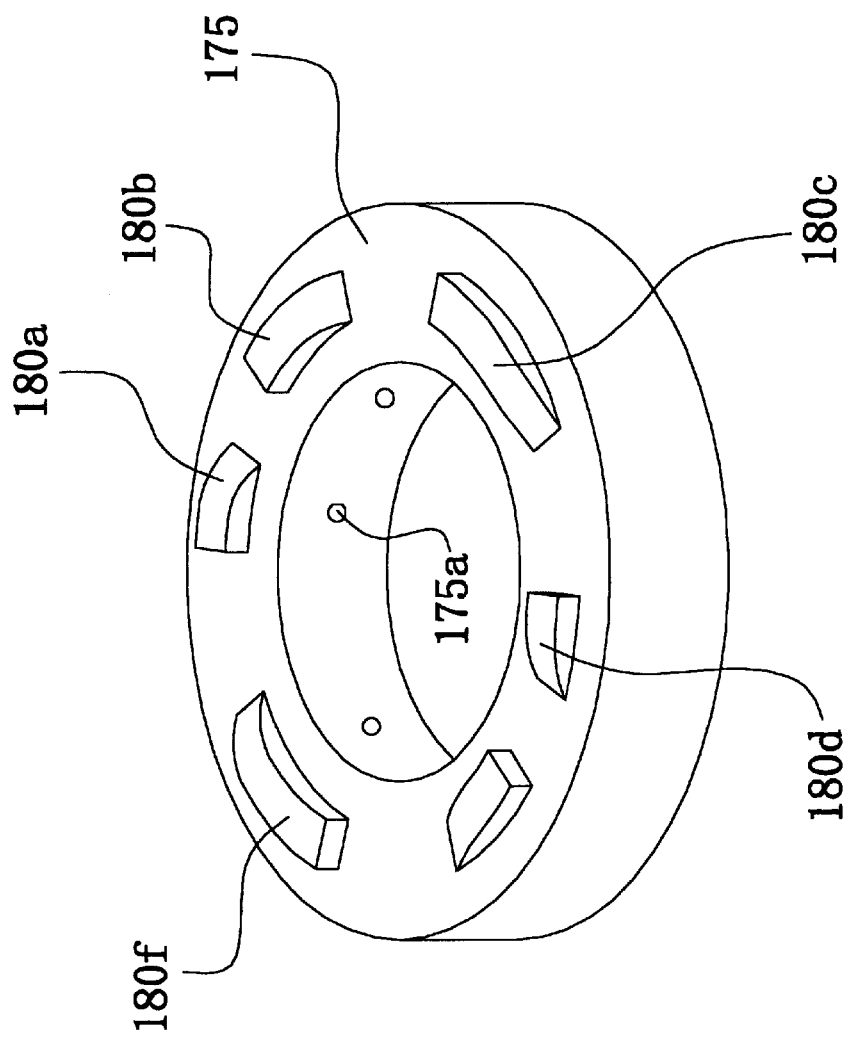
FIG. 21 is a perspective view of the cam collar depicted in FIGS. 19 and 20.

A fifth embodiment is depicted in FIGS. 19, 20 and 21. As shown in FIG. 19, there is a fishing reel 150. The fishing reel 150 includes a spool 7 and spool shaft 20 that are generally similar to those of the first and third embodiments. However, in the fifth embodiment, brake weights 155 are employed, as shown in FIG. 19. The brake weight 155 are pivotally fixed to a brake support 160. The brake support 160 is fixed to the spool shaft 20 for rotation therewith. In the depicted embodiment, there are six brake weights 155, each brake weight having a leg portion 155a and a foot portion 155b. Each of the brake weights 155 is able to pivot about a pin that extends through a radial outer portion of the brake support 160.

In response to rotation of the spool 7, each leg portion 155a of the brake weights 155 is forced radially outward by centrifugal forces. As a result, each foot portion 155b is forced into contact with brake race 50'. The brake race 50' is fixed to a portion of a dial case 75'. The dial case 75' is fixed to the reel housing 76. Therefore, the outward movement of the brake weights 155 creates friction contact that provides a braking force against rotation of the spool 7.

As with the embodiment depicted in FIG. 12, there is an adjuster knob 100' in the fifth embodiment depicted in FIG. 19. The adjuster knob 100' includes legs 100a that extend through openings 75e in the dial case 75'. The openings 75e in the dial case 75' have an arcuate or circumferential length of at least 60° which allow the legs 100a (and the knob 100') to rotate. The legs 100a are formed with gear teeth which engage corresponding gear teeth on a cam collar 175. The cam collar 175 is rotatably disposed about the brake support 160. The brake support 160 may be provided with ball/spring detents, or other such similar protrusions, which engage depressions 175a on an inner surface of the cam collar 175 for restraining rotation of the cam collar 175. The depressions 175a are shown more clearly in FIG. 21.

The cam collar 175 is formed with a plurality of cams 180a, 180b, 180c, 180d, 180e and 180f. The cams 180a–180f are configured to contact the leg portion 155a of the brake weights 155 in order to prevent the corresponding foot portion 155b from contacting the brake race 50'. For instance, in the position shown in FIG. 19, the cams 180a–180f are all spaced apart from the leg portions 155a. Therefore, all six of the leg portions 155a can swing outward allowing the foot portions 155b to contact the brake race 50'.

By rotating the cam collar 175, various cams of the cams 180a–180f may be brought into contact with the leg portions 155a, thus preventing the corresponding foot portion 155b from contacting the brake race 50'. The size, length and spacing of the cams 180a–180f may be varied such that one cam at a time may engage a corresponding leg portion 155a as the cam collar 175 is rotated.

Alternatively, the cams may be configured to engage pairs of leg portions 155a as is shown in the configuration in FIGS. 20 and 21. Specifically, upon rotation of the cam collar 175, the pairs of cams 180c and 180f will engage two leg portions 155a to move the corresponding brake weights 155 to a retracted position. Thereafter, upon continued rotation of the cam collar 175, the pair of cams 180b and 180e will engage two leg portions 155a to move the corresponding brake weights 155 to a retracted position, making four of the brake weights dis-engaged. Continued rotation of the cam collar 175 will bring the remaining cams 180a and 180d into engagement with the last two leg portions 155a to move the corresponding brake weights 155 to a retracted position, bringing all of the brake weights into a retracted or dis-engaged position.

In each of the above described embodiments it is possible to adjust the number of brake weights from an engagement position to a retracted position (and back again) by simply rotating a knob or dial that is accessible from outside of the fishing reel housing. No dis-assembly of the fishing reel housing is necessary.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A fishing reel having an adjusting mechanism for a brake mechanism, the fishing reel comprising:
    a reel body;
    a spool supported in said reel body for rotation;
    a brake mechanism connected to said spool, said brake mechanism including a plurality of brake weights, each of said brake weights formed with a protrusion;
    a cam collar formed with at least one convoluted groove, said convoluted groove defining cam surfaces, said protrusion on each of said brake weights extending into said convoluted groove such that in response to rotation of said cam collar with respect to said spool said brake weight is adjusted between an engagement position and a retracted position for producing braking force against rotation of said spool;
    a dial supported in said reel body and configured for selective engagement with said cam collar, wherein said dial extends at least partially out an opening in said reel body for easy adjustment.

2. The fishing reel as set forth in claim 1 wherein said brake mechanism further comprises a brake shaft holder having a plurality of radially extending shafts, said brake weights being disposed on respective ones of said shafts.

3. The fishing reel as set forth in claim 1, further comprising a brake race fixed to said reel body proximate said spool, said brake weights being configured for engagement with an inner radial surface of said brake race in response to centrifugal force.

4. The fishing reel as set forth in claim 1, wherein said dial is formed with a plurality of protrusions and said reel body is formed with one aperture on a side surface thereof adjacent to said opening through which said dial extends, said dial being configured such that any one of said plurality of protrusions is extendable into said aperture in response to positioning of said one of said plurality of protrusions adjacent to said aperture.

5. The fishing reel as set forth in claim 1, wherein said dial is spring biased into engagement with a side portion of said reel body.

6. The fishing reel as set forth in claim 1, wherein said dial is formed with two protrusions having gear teeth formed on a distal end thereof, said protrusions being engagable with gear teeth formed on said cam collar.

7. The fishing reel as set forth in claim 1 wherein said brake mechanism further comprises:
    a brake shaft holder having a plurality of radially extending shafts, said brake weights being disposed on respective ones of said shafts, said brake shaft holder further formed with a plurality of axially extending lips that are circumferentially spaced apart from one another; and
    wherein said cam collar is disposed within said axially extending lips, said cam collar being formed with a plurality of radially extending protrusions which contact and engage said lips at least partially restraining relative rotation between said cam collar and said brake shaft holder.

8. The fishing reel as set forth in claim 1 wherein said brake mechanism further comprises:
    a brake shaft holder having a plurality of radially extending shafts, said brake weights being disposed on respective ones of said shafts, said brake shaft holder further formed with central opening formed with a plurality of recesses that are circumferentially spaced apart from one another; and
    wherein said cam collar is located adjacent to said brake shaft holder and is formed with at least one tab that is engaged with one of said recesses in order to releasably retain said cam collar in position with respect to said brake shaft holder.

9. The fishing reel as set forth in claim 8, wherein said brake mechanism further comprises:
    a locking member disposed adjacent to said dial, said locking member formed with gear teeth engagable with corresponding gear teeth on said brake shaft holder such that with said locking member engaged with said brake shaft holder, said brake shaft holder and said spool are restrained against rotation.

10. The fishing reel as set forth in claim 1, wherein said brake mechanism comprises six of said brake weights and said convoluted groove is configured to adjust one brake weight at a time from an engagement position to a retracted position in response to rotation of said cam collar with respect to said spool.

11. The fishing reel as set forth in claim 1, wherein said brake mechanism comprises six of said brake weights and said convoluted groove is configured to adjust two brake weight synchronously at a time from an engagement position to a retracted position in response to rotation of said cam collar with respect to said spool.

12. The fishing reel as set forth in claim 1, wherein said cam collar formed with two of said symmetrical convoluted groove.

13. The fishing reel as set forth in claim 1, wherein said cam collar formed with six of said convoluted groove.

14. A fishing reel having an adjusting mechanism for a centrifugal brake mechanism, the fishing reel comprising:
    a reel body;
    a spool supported in said reel body for rotation with respect there to;
    said centrifugal brake mechanism which rotates with said spool, said centrifugal brake mechanism having a plurality of brake weights which move radially outward in response to centrifugal force such that said brake weights are engagable with a brake race attached non-rotatably to said reel body;
    a brake adjusting member being selectively relatively rotatable with respect to said spool such that said brake adjusting member regulates a radial position of each of said brake weights from an engagement position to a retracted position with respect to said brake race; and
    an adjusting member supported on said reel body, said adjusting member being selectively engagable with said brake adjusting member such that rotation of said adjusting member causes rotation of said brake adjusting member, said adjusting member being rotatable from outside of said reel body.

15. The fishing reel as set forth in claim 14, wherein said adjusting member is configured to move from a dis-engaged position to an engaged position with respect to said brake adjusting member.

16. The fishing reel as set forth in claim 15, wherein said adjusting member is movable in an axial direction with respect to said spool from said dis-engaged position to said engaged position.

17. A fishing reel having an adjusting mechanism for a brake mechanism, the fishing reel comprising:
   a reel body;
   a spool supported in said reel body for rotation;
   a brake mechanism connected to said spool, said brake mechanism including a plurality of brake weights;
   a cam collar formed with at least one cam surface configured for engagement with at least one of said brake weights such that in response to rotation of said cam collar said brake weight is adjusted between an engagement position and a retracted position for producing braking force against rotation of said spool;
   a dial supported in said reel body and configured for selective engagement with said cam collar, wherein said dial extends at least partially out an opening in said reel body for easy adjustment.

18. The fishing reel as set forth in claim 17 wherein said dial is spring biased to partially extend out of said opening.

19. The fishing reel as set forth in claim 17, wherein said dial is formed with two protrusions having gear teeth formed on a distal end thereof, said protrusions being selectively engagable with gear teeth formed on said cam collar.

20. The fishing reel as set forth in claim 17 wherein said brake mechanism further comprises six of said brake weights and said cam collar includes six of said cam surfaces.

21. The fishing reel as set forth in claim 17, wherein said brake mechanism further comprises a brake support, and said brake weights comprise a leg portion and a foot portion, said leg portion being attached to said brake support for pivotal movement in a plane generally parallel to an axis about which said spool rotates.

22. The fishing reel as set forth in claim 17, further comprising a brake race fixed to said reel body proximate said spool, each said foot portion of said brake weights being configured for engagement with an axial face of said brake race in response to centrifugal force.

* * * * *